US011823042B2

(12) United States Patent
Shadrokh et al.

(10) Patent No.: US 11,823,042 B2
(45) Date of Patent: Nov. 21, 2023

(54) SYSTEM FOR MEASURING FOOD WEIGHT

(71) Applicant: Rama Shadrokh, Great Neck, NY (US)

(72) Inventors: Rama Shadrokh, Great Neck, NY (US); Cristina Garcia Jaime, Cadiz (ES); Angel Carlos Roman Garcia, Caceres (ES)

(*) Notice: Subject to any disclaimer, the term of this patent is extended or adjusted under 35 U.S.C. 154(b) by 107 days.

(21) Appl. No.: 16/676,343

(22) Filed: Nov. 6, 2019

(65) Prior Publication Data

US 2020/0159750 A1    May 21, 2020

Related U.S. Application Data

(63) Continuation-in-part of application No. 16/436,958, filed on Jun. 11, 2019, now abandoned, and a
(Continued)

(51) Int. Cl.
| | |
|---|---|
| *A23L 33/00* | (2016.01) |
| *G06N 3/08* | (2023.01) |
| *G06F 16/28* | (2019.01) |
| *G06F 16/22* | (2019.01) |
| *G06F 16/248* | (2019.01) |

(Continued)

(52) U.S. Cl.
CPC ............... *G06N 3/08* (2013.01); *A23L 33/30* (2016.08); *G06F 3/0482* (2013.01); *G06F 16/22* (2019.01); *G06F 16/248* (2019.01); *G06F 16/287* (2019.01); *G06F 16/9035* (2019.01); *G06F 18/214* (2023.01); *G06V 10/25* (2022.01); *G06V 10/50* (2022.01); *G06V 10/56* (2022.01); *G06V 10/764* (2022.01); *G06V 10/82* (2022.01); *G06V 20/68* (2022.01)

(58) Field of Classification Search
CPC ... G06Q 30/0603; A23L 33/30; G06F 3/0482; G06F 16/22; G06F 16/248; G06F 16/287; G06F 16/9035; G06F 18/214; G06N 3/08; G06V 10/25; G06V 10/50; G06V 10/56; G06V 10/764; G06V 10/82; G06V 20/68
See application file for complete search history.

(56) References Cited

U.S. PATENT DOCUMENTS 10,290,047 B1 * 5/2019 Goyal ................ G06Q 30/0633
10,856,807 B2 * 12/2020 Fitzpatrick ........... A61B 5/4866
(Continued)

*Primary Examiner* — William V Gilbert
(74) *Attorney, Agent, or Firm* — Handal & Morofsky LLC; Anthony H. Handal

(57) ABSTRACT

This invention provides a system and method to measure weight and nutritional information of meal. The present application may be hosted on the cloud by the service provider or provide a tailor-made application for use in mobile computing devices that includes a digital camera working in combination with the neural network based application hosted over the internet. Photos captured by the mobile computing devices are analyzed by image processing module of the system. The neural network within the system learns from plurality of sub processes like image processing module, region of interest identification, thickness estimation etc. by updating or modifying the training data set after evaluations. The modified or updated dataset aid neural network in obtaining faster and precise results in future evaluations thus reducing the load on computing resources of the computing system of server, customers and restaurants.

22 Claims, 16 Drawing Sheets

Related U.S. Application Data continuation-in-part of application No. 29/687,028, filed on Apr. 10, 2019, now abandoned, and a continuation-in-part of application No. 15/672,340, filed on Aug. 9, 2017, now abandoned.

(60) Provisional application No. 62/899,177, filed on Sep. 12, 2019.

(51) Int. Cl.

| | |
|---|---|
| *G06F 3/0482* | (2013.01) |
| *G06F 16/9035* | (2019.01) |
| *G06V 10/25* | (2022.01) |
| *G06F 18/214* | (2023.01) |
| *G06V 10/56* | (2022.01) |
| *G06V 10/764* | (2022.01) |
| *G06V 10/82* | (2022.01) |
| *G06V 10/50* | (2022.01) |
| *G06V 20/68* | (2022.01) |

(56) References Cited

U.S. PATENT DOCUMENTS

| | | | |
|---|---|---|---|
| 2009/0070139 A1* | 3/2009 | Ifland | G16H 20/60 |
| | | | 705/2 |
| 2016/0353235 A1* | 12/2016 | Williams | H04W 4/02 |
| 2017/0098264 A1* | 4/2017 | Priebatsch | H04L 67/52 |
| 2018/0240359 A1* | 8/2018 | Hujsak | G06N 5/022 |
| 2018/0285465 A1* | 10/2018 | Schaffernoth | G06F 16/29 |
| 2018/0293638 A1* | 10/2018 | Simpson | G06N 3/08 |
| 2020/0334584 A1* | 10/2020 | Petroulas | G06Q 10/02 |

\* cited by examiner

SYSTEM FOR MEASURING FOOD WEIGHT

CROSS REFERENCE TO RELATED APPLICATIONS

This application claims the benefit and priorities of U.S. Patent Application No. 62/899,177, filed Sep. 12, 2019, Food Ordering System and Method Based on Predefined Variables, Filed 8/9/2017, U.S. patent application Ser. No. 15/672,340, Food Ordering System Based on Predefined Variables, filed Jun. 11, 2019, U.S. patent application Ser. No. 16/436,958, and System for Measuring Food Weight, filed Sep. 12, 2019, U.S. Patent Application No. 62/899,177, the disclosures of which are hereby incorporated herein by reference thereto.

FIELD OF THE INVENTION

The present system relates to a system and method for evaluating weight of food items and nutritional information accurately and quickly in order to improve the restaurant services and customer experience.

BACKGROUND OF THE RELATED ART

Any discussion of documents, acts, materials, devices and articles or the like which has been included in this specification is solely for the purpose of providing a context for the present invention. It is not to be taken as an admission that any or all of these matters form a part of the prior art base or were common general knowledge in the field relevant to the present invention as it existed in the United States of America or elsewhere before the priority of this application.

According to the Centers for Disease and Disease Control and Prevention, 36% American adults and 17% of the under 19 American youth is obese. Increase in calorie intake and inadequate physical activity are the leading factors of obesity. According to the National Health and Nutrition Examination Survey, the intake of calories in the US population is increasing every passing year. The numbers have risen alarmingly in the past decade.

There are many systems that assist people in diet control and weight management by helping them manage and monitor their caloric intake. However, all those diet programs and systems prove to be inconvenient when a user eats outside of his/her home and more particularly eating meals prepared by restaurants. While a few restaurants do provide limited information about portion size and nutritional value of a meal, the same is often either unpredictable or undefined, thus making it difficult for a person on weight control therapy to make good decisions while ordering food items.

Conventional Internet-based systems usually allow a person to locate nearby restaurants online. However, these systems must rely on the individual restaurants for any dietary information which they might provide, again limiting them to providing limited and unreliable nutritional information for the food items on their menu. Further, they fail to allow a person to identify food retail locations based on dietary needs.

Ordering from restaurants is complicated by other factors. For example, many people have food allergies, diet restrictions, or other reasons to avoid various food preparation methods. These restrictions may arise from health concerns, cultural considerations, medical reasons etc. It may further be difficult to select meals from a presented menu which comply with such dietary requirements.

While eating at home, people generally have greater control over the ingredients of food and drinks. However, while eating out in or ordering from cafeterias and restaurants, it is difficult to estimate the nutritional content of food and drinks ordered, purchased and consumed. Even a person without strict dietary requirement would benefit considerably from a system or method which provides the person with additional information about food choices, particularly when the person is choosing from a list of meal options presented within a restaurant or over the Internet. However such additional information is useful for selecting healthy meals, and to avoid excessive food consumption.

In United States Patent No. U.S. Pat. No. 9,977,980B2 to Joshi et al talks about a "Food Logger" that provides various approaches for learning or training one or more image-based models of nutritional content of meals. The Food Logger needs to determine scale relative to known objects in the meal image. For example, for adults, hand size is generally close enough to allow the Food Logger to determine the difference between plate, cup, or container sizes when the user's hand is in the picture next to the food as a reference. Similarly, other objects (e.g., keys, phone, credit card, business card, eating utensils, etc.) in the meal image that are either recognizable (in terms of size) or that have been previously entered as a data point for model training can also be used as references to determine the difference between plate, cup, or container sizes. In other words, objects co-located with the food in the meal image and having a pre-defined or automatically determinable size are usable by the Food Logger as the basis to estimate plate, cup or container sizes and thus food volumes on the plate.

Additionally, in few embodiments the food logger uses a depth sensor camera to capture meal images and using that 3-D information, the Food Logger uses various known imaging techniques to solve the scale question, and thus the volume question. In cases where images of co-located objects or 3D information are not available with respect to the meal image, the Food Logger uses guided user interaction to allow the user to update or correct portion size.

The present invention does not need to be input with the dimensions of reference objects like utensils, hand, keys, phone, credit card, business card present in the image to provide accurate results while the prior art "food logger" system relies on reference objects to estimate the portion size of food. Additionally, the present invention does not need depth sensor camera which is rarely provided in smartphones to calculate volume and weight of the food item. The present invention also does not need to ask the user to update the correct portion size.

United States Patent No. U.S. Pat. No. 9,424,495B1 to Trevino talks about a method for identifying and analyzing amounts and nutritional values of food consumption, utilizing digital image processing and linked nutritional information. A recipe generator is utilized to provide a component analysis of food preparations based on identification of subcomponents. Trevino's invention has managed to determine the amount of nutrient consumed by analyzing the before meal and after meal image by using surveillance. Trevino's invention process the data collected through surveillance cameras at later stages to calculate the consumption of food. However, it fails to recommend food to the user according to nutrition and portion size served.

United States Patent No. U.S. Pat. No. 9,529,385B2 of Connor talks about a device and system for monitoring a person's food consumption comprising: a wearable sensor that automatically collects data to detect probable eating events; a voluntary human-to-computer interface that is used by the person to enter food consumption data wherein the person is prompted to enter food consumption data when an eating event is detected by the wearable sensor; and a data analysis component that analyzes food consumption data to estimate, for example, the types and amounts of food components, types of foods, nutrients, and calories that are consumed by the person.

Connor's system does not provide for measuring weight and nutritional content of the food served and make recommendations to the user according to his/her preferences. Additionally, the voluntary human-to-computer interface of Connors invention that prompts the person to use to enter food consumption data during a selected period of time associated with an eating event.

United States Patent No. U.S. Pat. No. 8,363,913B2 to Boushey et al talks about custom software for use in mobile computing devices that include a digital camera. Photos captured by mobile digital devices are analyzed with image processing and comparisons to certain databases to allow a user to discretely record foods eaten. Specifically, the user captures images of the meal or snack before and after eating. The foods pictured are identified. Image processing software may identify the food or provide choices for the user. Once a food is identified and volume of the food is estimated, nutrient databases are used for calculating final portion sizes and nutrient totals. Boushey's invention needs to take multiple images from different angles to get an idea of depth information which is big limitation considering restricted storage space on mobile phones. The present invention needs only one image spanning all the food items about which user want to get weight and nutritional information.

SUMMARY OF THE INVENTION

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

The system and method may be applied to point of sale kiosks as well as wireless data devices for use in restaurants, cafeterias, coffee shops and other food retail outlets. In accordance with the invention it is also contemplated that the system will be deployed over the Internet, with users employing their smart phones to browse and evaluate available meals and place orders with local restaurants. During the process of ordering food, the inventive system determines the weight and nutrient parameters of the meal ordered in real time as the user adds and/or deletes items.

The system of the present invention improves its database by determining the total weight of various components of restaurant menu selections based upon customer uploaded restaurant menu item images. In general, the images provided by different customers are analyzed to set an average weight for the individual food item for the particular restaurant, and, desirably, but optionally, keyed to the time of the order in order to differentiate between, for example, lunch versus dinner food preparation practices, portions and so forth.

As discussed above, weight and nutritional information for the food items is determined and presented to the consumer in real time as menu items are added and subtracted from the order and item variations (such as the number of chicken nuggets selected) are input by the consumer.

The system may also suggest subsequent choices for the order. This may be done by a text suggestion, highlighting of an item, a recommended item or the like, and may be parsed, or otherwise depicted to aid the consumer in selecting meals that are tailored to their individual preferences.

In general, the food weight measurement system as described herein provides various approaches for learning or training the neural network of the inventive system. By neural network is meant the system of the present invention, a database of food images and related information, the software for correlating meal images to meal food components, such as the food components of a side of fries and lettuce as well as the chicken fillet on a bun which are part of a chicken fillet plate as might be sold by a restaurant, software for determining weight and calculating nutrition facts for the menu item, and, more desirably, nutrition facts for a complete meal, for example comprising a cup of soup, the chicken fillet plate, a lemonade, a dessert and coffee.

In accordance with the invention, it is contemplated that training of the inventive neural network may further be approved by using a dataset of images of food uploaded by the customers. More particularly, it is contemplated that customers will be encouraged to use their smart phones to take pictures of the meals which they order and send them to the operator of the inventive system where they will be correlated with the menu items ordered for the purpose of verifying the nutritional and weight data associated with the particular restaurant menu item. In this way, pictures of meals which are prepared by the restaurant operator, but which are inaccurate compared to the meals which are actually delivered by the restaurant, are not the only source of nutritional information. Rather, nutritional information can be based primarily on actual meals ordered by the customers. There is a variety of information displayed on the customer's device in relation with the food items. The examples include but are not limited to portion sizes of the meal served by the restaurant, weight of the food items, food components used and nutritional content of the meal. Customers are encouraged to send such meal pictures by being offered incentives, such as coupons for, by way of example, free or discounted food.

In an embodiment of the present invention, the food weight measurement system as described herein begins by obtaining the image captured from the camera module of a device (for example an image sent by a customer and user to the operator of the system of an actual meal obtained from a particular restaurant) or accessing a previously stored image in the database (for example a photograph provided by the restaurant). The system simultaneously provides a recipe template that contains information like food component names, names of the various types of food that form the components of, for example, a meal, food component weight per serving and other information needed for training the neural network to make food recommendations.

The present invention estimates weight of the meal present on the customer's table. It operates by using one or more databases of training images obtained from restaurants and user-customers, (or even pictures that the operator of the system takes from meals with known components) of the vast range of food items particularly the screenshots of food component. The system further calculates the most likely portion of the image which corresponds to the food component which is marked by the system as a Region of Interest (such as the filet of chicken in a chicken sandwich) in the picture of the captured meal. More particularly, in accordance with the algorithm of the preferred embodiment, restaurant menu item images are resized to 300×400 px and converted to 8 bit RGB color scale, comprising 512 different colors. These image conversions are used to speed up the system and to standardize the images provided by restaurants and users. The region size of the image used to compare the color of the food components is 30×30 pixels and K-Nearest Neighbours algorithm is applied to improve the food component identification. The K parameter used for the algorithm is 3. These 30×30 pixel regions are overlapped, with a distance between each data point and the center location of the next 30×30 region of 3 pixels with a pixel threshold for food component identification of 10. However, the region size, the overlapping distance, the K parameter value, the threshold value and the number of colors, are variables that may be adapted according to the image size, the type of cuisine of the restaurant and the food type with the aim of improving the food component identification of restaurant menu items with different characteristics. Overlapped 30×30 pixel regions of the picture are transformed to color histograms treated as feature vectors that are compared to feature vectors from stored food component color histograms in a component color database. The region of interest is determined on the basis of a graphical area delineated by, typically, identifying the food component color on the image. The component color database further comprises color histograms of the previous identified food components. More particularly, during the initial analysis, the probability of each 30 pixel×30 pixel region of the restaurant menu item image to be a food component is calculated and then the 30×30 pixels region is assigned to a particular food component or to the area corresponding to a plate or a table on which a plate is resting. Therefore, after evaluation of the restaurant menu item image, the component color database continually updates data and facilitates training the neural network of the said system.

In accordance with the invention, the system calculates the most likely food component (for example, lettuce, chicken fillet, hamburger bun, etc.) of for overlapped regions of 30 by 30 pixels. Multiple 30×30 regions are transformed to color histograms with a distance between each data point and the center location of the next 30×30 region of 3 pixels. Each region is then transformed to a color histogram and treated as a feature vector that is compared to the food component feature vectors from the food component color histograms stored in the the component color database. Every pixel is compared to the component color database up to eight times. Once that each pixel has been identified as a particular food component, all the pixels belonging to the same food component form the region of interest of the food component. The system may then proceed to calculate size, then volume, then weight and then nutritional value. Nutritional value may be determined from known nutritional values for particular foods, or it may be generated from a recipe, looking at the individual ingredients in the recipe.

In another embodiment of the present invention, the inventive system identifies Regions of Interest (ROI) for the corresponding food component by training the neural network after image evaluation in order to improve the identification of the food components. Hypothetical points of the food components detected in the food image create a region of interest spanning that food component. After several evaluations the dataset of food components will grow and the neural network will be able to identify Regions of Interest more precisely.

In yet another embodiment of the present invention, the system proceeds to calculate volume of the food component once the area in pixels and the estimated thickness of the food components is available. However, prior to volume calculation the system needs to convert area from measurements delineated in pixels to area in $cm^2$. In accordance with the invention this is accomplished by the system using a conversion factor. For every evaluated food component, the system stores the relation between weight/pixel and the median conversion factor of the food components present on the image. Weight/pixel and the conversion factor are inversely proportional to each other. It is noted that this conversion factor depends upon the scale of the photograph which may be judged from a reference object of known dimension, such as a fork, knife, hand, plate or the like.

In yet another embodiment of the present invention, the system evades taking into account the dimensions of the utensils and other dinnerware items with which the meal is served. The system stores for each evaluated food component the relation between pixels and weight and the median conversion factor for the food components present on the image. As appears more fully herein, the conversion factor is developed from information relating to pixels, weight, thickness and density. Every time a food component is evaluated, the information about the applied conversion factor is stored for that specific food component with the aim of using it for the next set of evaluations. For example, the system may use food component features of known dimension, such as tomato seeds, chicken fillet size which is often the same from meal to meal, certain not sizes (such as almonds or walnuts which tend to be uniform, or other food items which tend to be of uniform size, such as apples or bananas).

In an embodiment of the present invention, the system calculates a food component's weight using the estimated density and the estimated volume for each food component, using, for example, estimations of volume extracted from photographs and estimations of density from publicly available data. Once the system obtains the weight of the individual food components, it calculates the nutritional value of each component of the meal. In accordance with the preferred embodiment, the nutritional values of all of the components of the meal are then added together to obtain the total nutritional value of the meal.

In accordance with the invention, optionally means are provided to allow an end user consumer to use nutritional information provided over a communication network from the inventive system on a portable electronic device, such as a smart phone or tablet, to create a diet log, for example for weight control purposes.

In accordance with the invention, a method of implementing transactions between a food providers and consumers while providing nutrition information to the consumer comprises creating a menu item database of menu items offered by food providers, the menu items comprising a plurality of components, the menu item database comprising menu item associated information and associated food provider identification information for a plurality of menu items. Menu item identification information associated with a menu item is obtained. The menu item identification information is stored in the menu item database. Food provider identification information is obtained for the food provider offering the menu item and stored the food provider identification information associated with the menu item identification information in the menu item database. The menu item identification information is stored as associated with the food provider identification information. Component inclusion information for the menu item is obtained and stored associated with the menu item in the menu item database, the component inclusion information being stored as associated with the menu item identification information. The method further comprises obtaining component nutrition information for the component or components and storing the component nutrition information associated with the menu item identification information and the component of the menu item in the menu item database. The above process is repeated for a plurality of menu items offered by a plurality of food providers. A plurality of menu items from a food provider are presented to a consumer. A consumer selection or deselection of a menu item is received from the consumer. The inventive method further comprises presenting the sum of all nutrition information for all of the components of the selected menu item or menu items to the consumer; and completing a sale of the selected menu item or menu items to the consumer.

In accordance with the invention, the method may further comprise receiving a menu item image, for which nutrition information is known, and storing the menu item image associated with the menu item identification information in the menu item database, identifying portions of the image associated with different components and dividing the image into a plurality of components, measuring the image size for each of the components, calculating a conversion factor for transforming image size to nutrition information based upon the image size and the stored component nutrition information, receiving a menu item image of a menu item for which nutrition information is not known, measuring the image size of the component(s) of the menu item for which nutrition is not known, and using the conversion factor to calculate nutrition information for each of the component or components of the menu item for which nutrition information is not known.

Optionally, component nutrition information is obtained from a published source.

Optionally, component nutrition information is derived from information in a recipe for the component.

Alternatively, component nutrition information may be obtained by preparing an example of the component in a kitchen.

Images of menu items are collected from consumers, with the images being broken down into individual component(s) image area(s), wherein the component image area(s) are operated on by the conversion factor to derive component nutrition information, and wherein the component nutrition information is used to improve the accuracy of component nutrition information for the component(s) of the menu item in the menu item database.

In addition, nutrition information may be presented substantially in real time as the menu items are selected and deselected at the same may be varied as the menu items are selected and deselected. In addition menu item price information may be presented, together with the sum of all price information for all selected menu items.

The method may be carried out with a central processing unit coupled to a computer memory, a program for carrying out the steps of the method being resident on the computer memory, and the menu item database together with all associated information and images being resident on the computer memory, the apparatus being coupled by network infrastructure to computing devices of the consumers.

Optionally, nutrition information for sold menu items may be placed in a database associated with the particular consumer to create a database of food consumption information to assist in consumer objectives such as weight loss and health.

Additionally, where several persons are associated with a particular order, nutrition information is associated with each person.

Such nutrition information for each person is supplemented by dietary intake information entered by the individual for food consumed but not purchased from the operator of the method.

Optionally, before or after menu item selection, menu items are suggested to the consumer for selection. The suggestion of menu items to the consumer is determined, at least in part, by prior menu item selections of the consumer. Optionally, one may determine the time of the selection and/or deselection of menu items by the consumer and menu item suggests is determined, at least in part, by the time of day. For example, a hamburger might be suggested at dinner time, while an egg sandwich might be suggested at 8 o'clock in the morning. Optionally, thickness may be estimated for a particular component and the system stores the estimated thicknesses, and wherein the estimated thickness may be used to generate the thickness of a component in a newly acquired image.

BRIEF DESCRIPTION OF THE ACCOMPANYING DRAWINGS

Figure 3A:
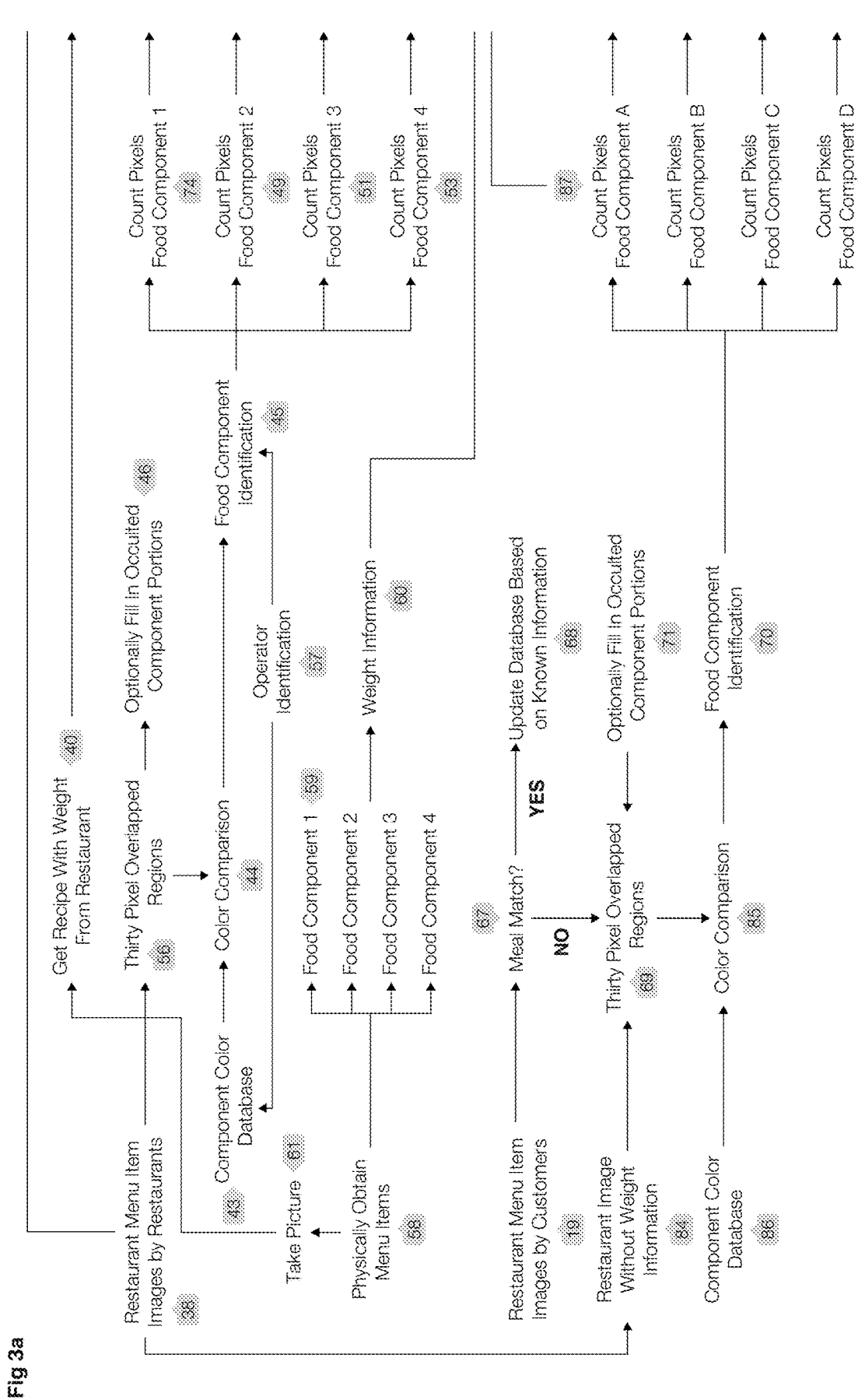
Figure 3B:
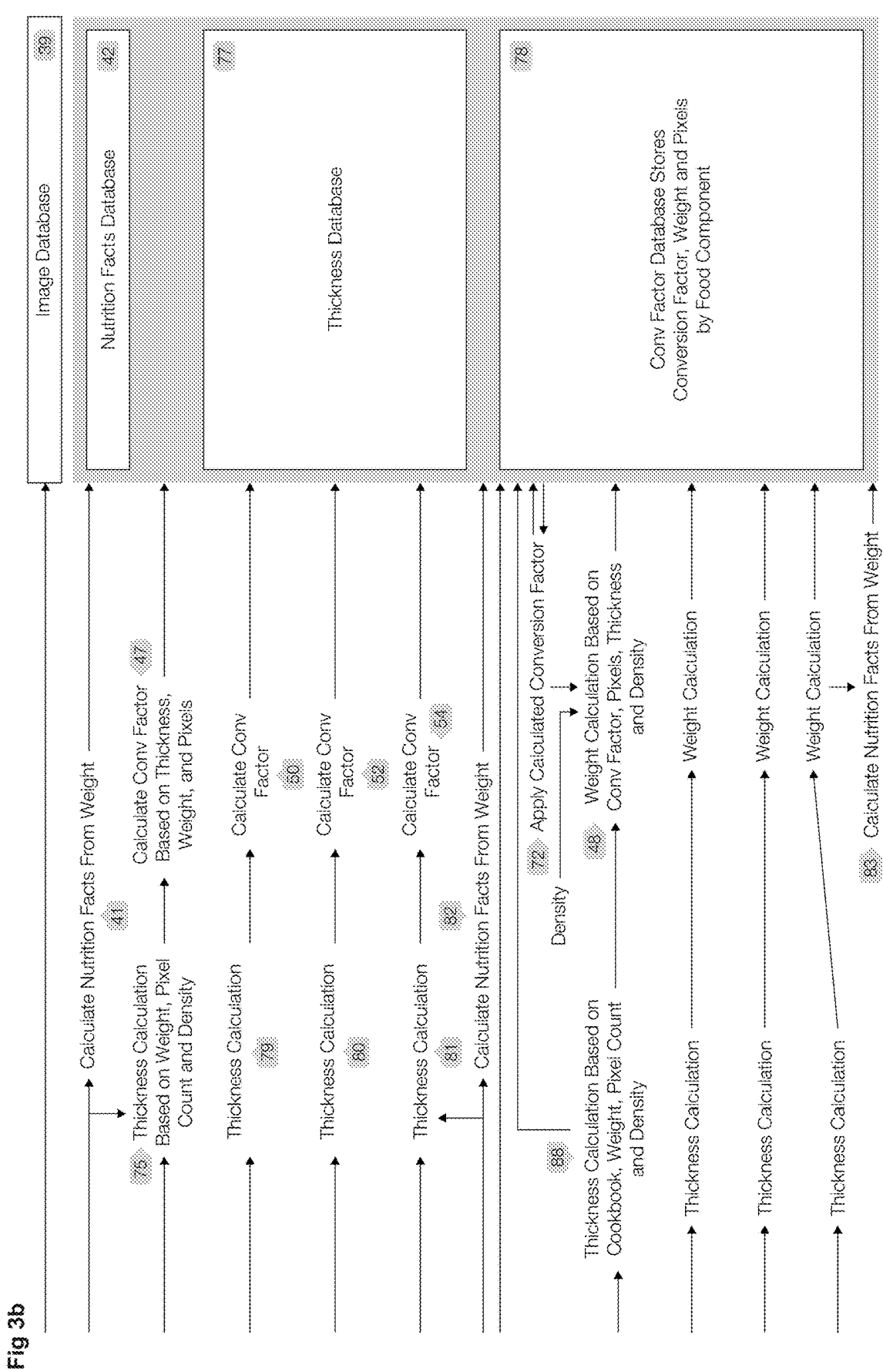

FIGS. 3a and 3b together comprise a generalized overview of image acquisition, analysis and use in accordance with the method and apparatus the present invention.

Figure 4A:
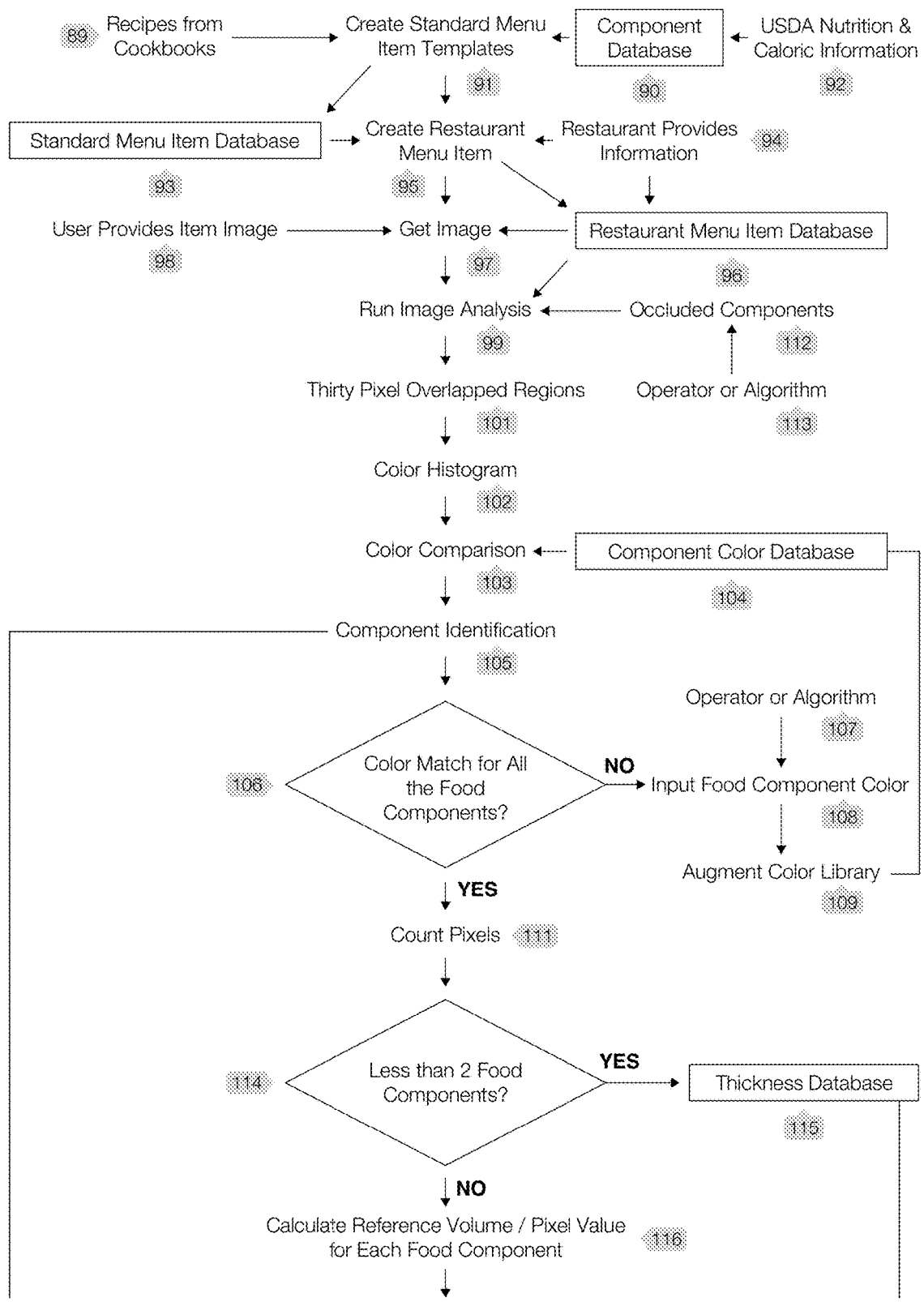
Figure 4B:
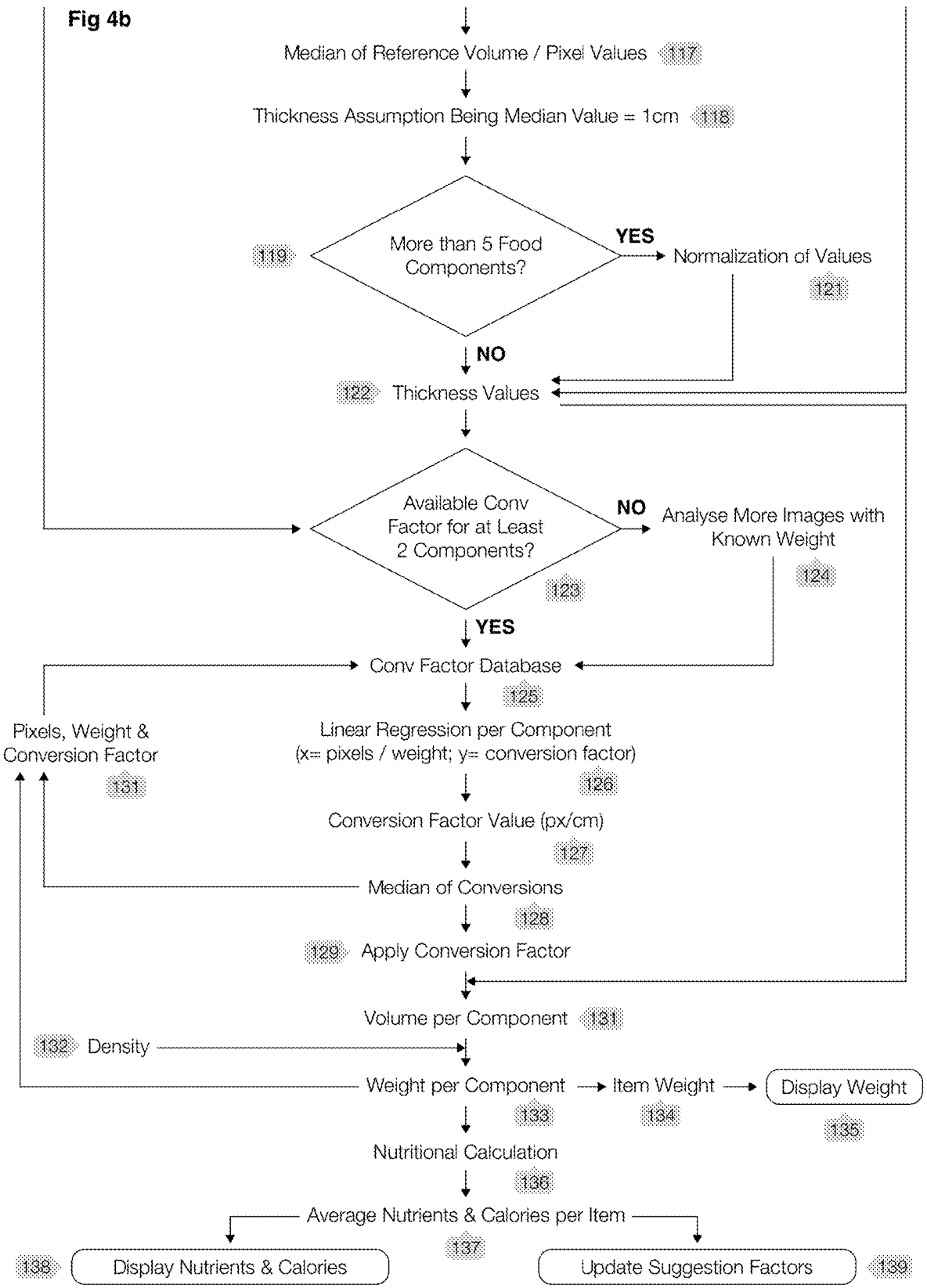

FIGS. 4a and 4b illustrate an exemplary embodiment of a method implementing the teachings of the present invention.

Figure 5:
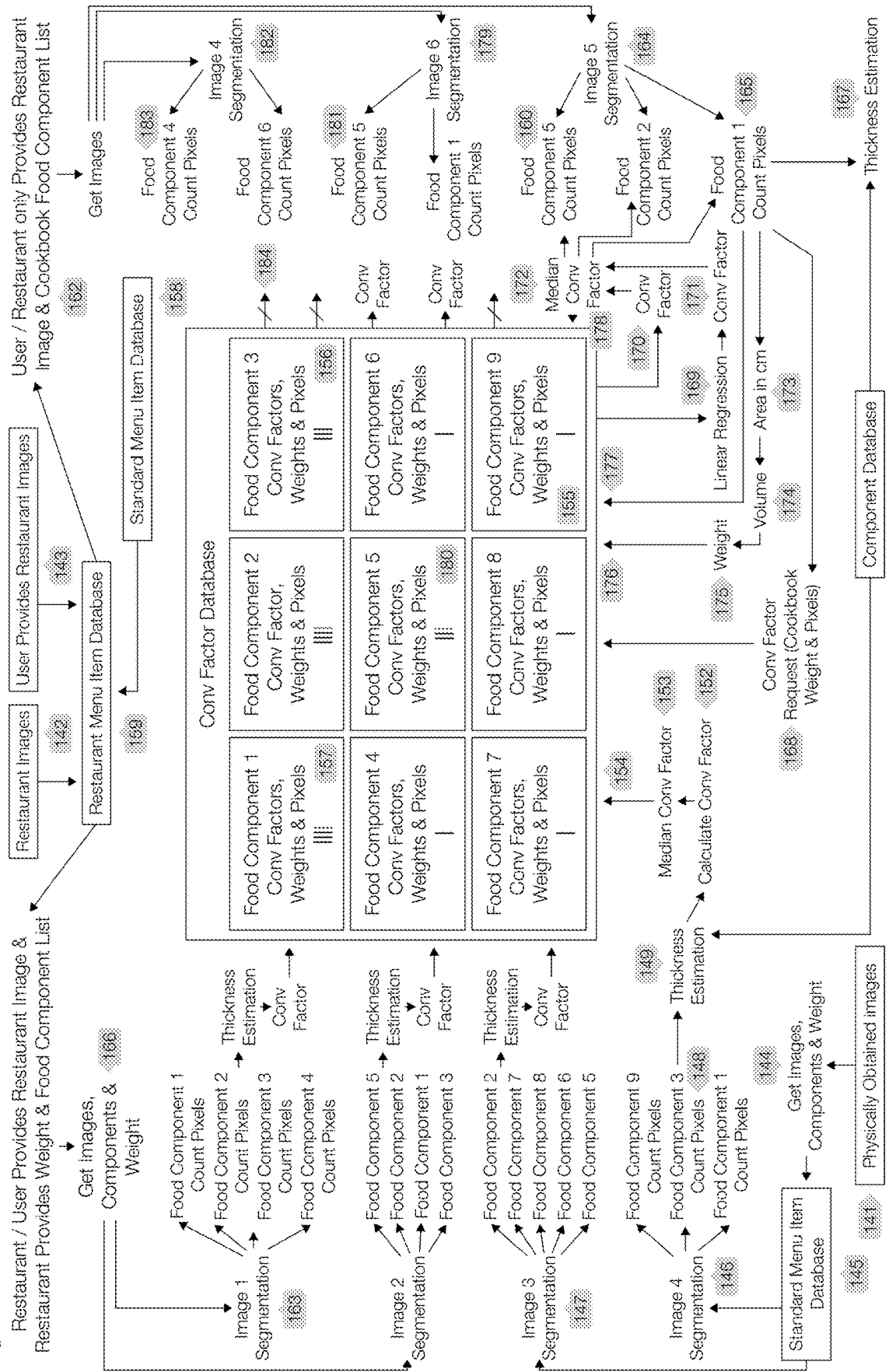

FIG. 5 is a flowchart illustrating exemplary method details in accordance with the teachings of the present invention.

Figure 6:
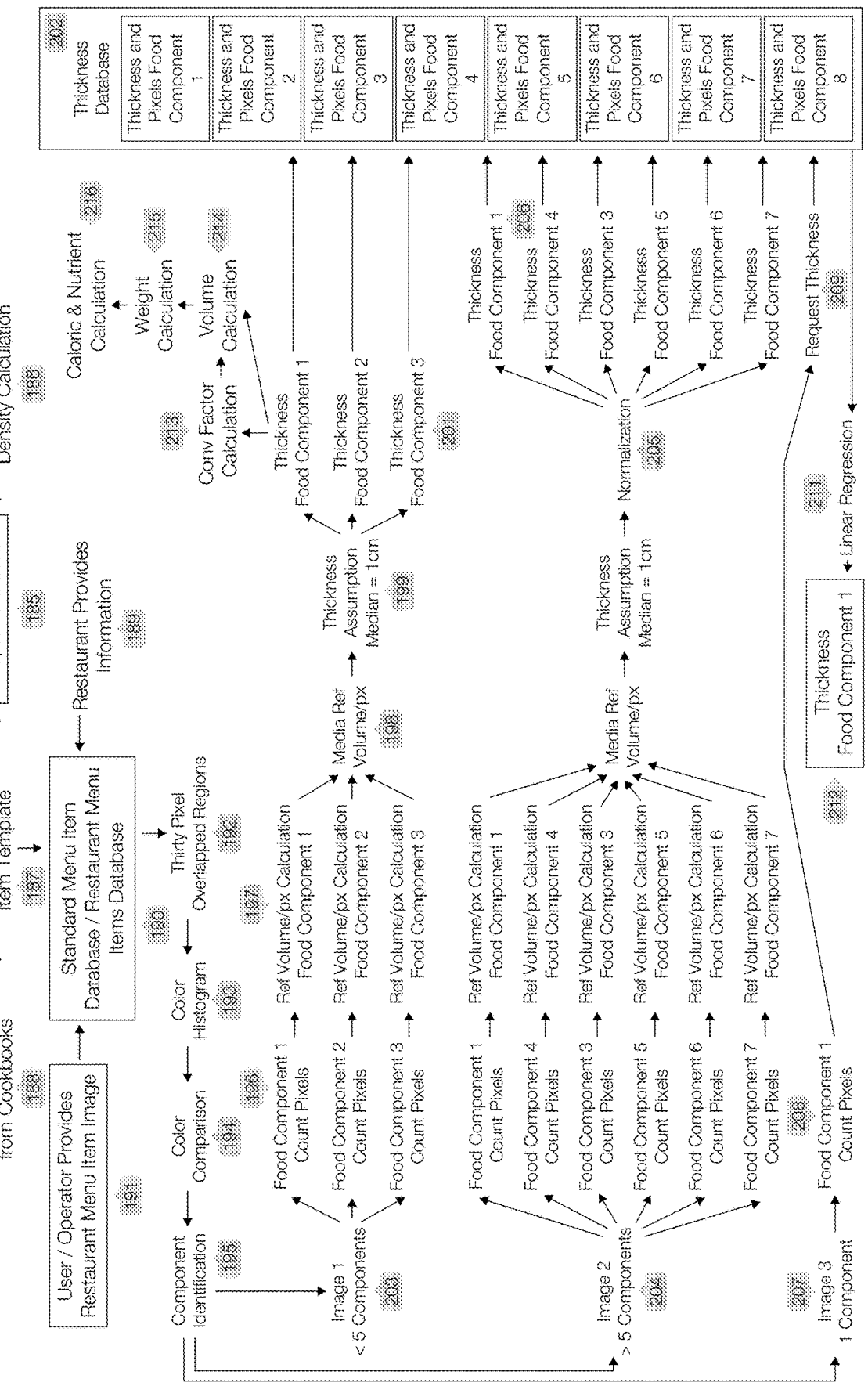

FIG. 6 is a flowchart illustrating thickness calculation in accordance with the teachings of the present invention.

Figure 7:
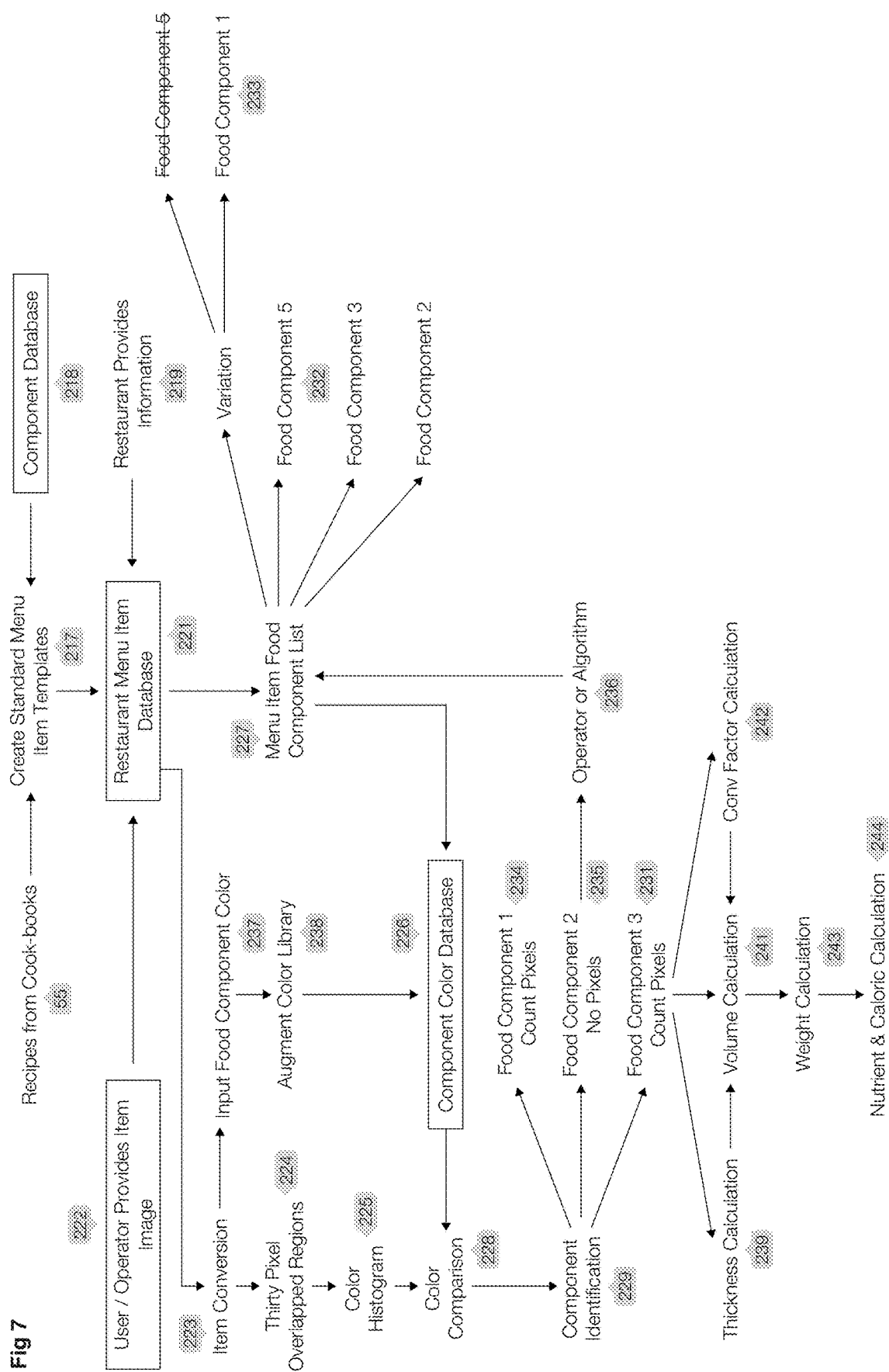

FIG. 7 illustrates the treatment of color information in accordance with the present invention.

Figure 8:
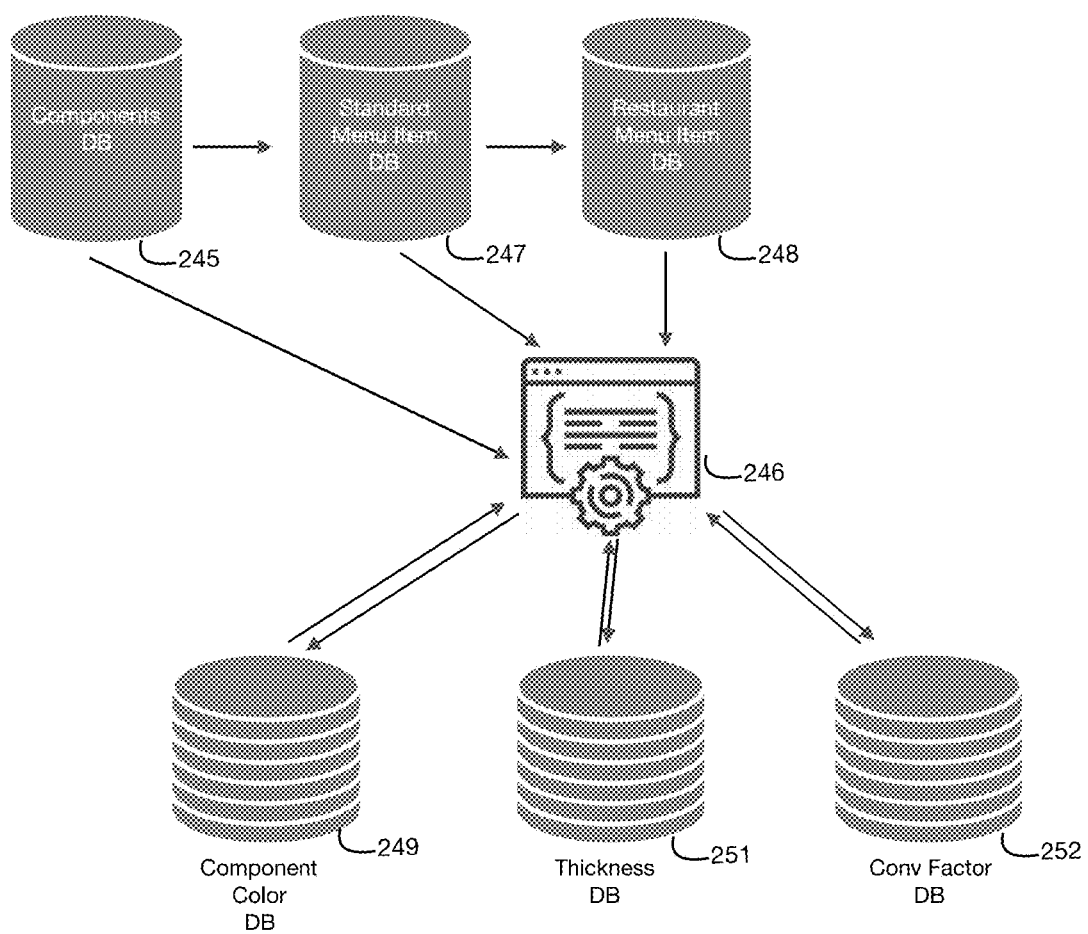

FIG. 8 illustrates the treatment of component, standard menu item and restaurant menu item information in accordance with the teachings of the present invention.

Figure 9:
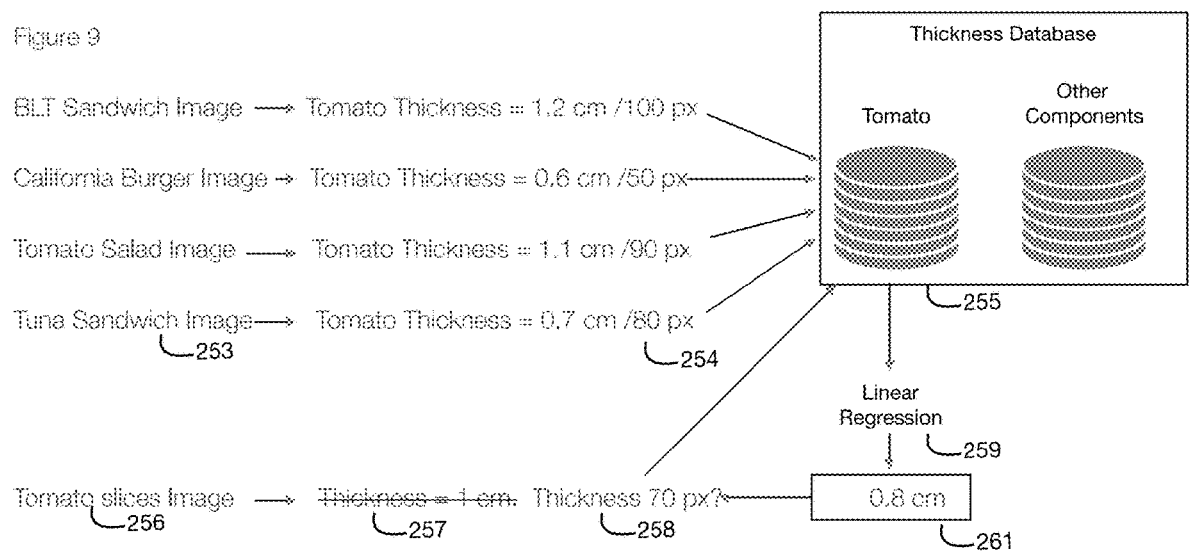

FIG. 9 illustrates manipulation of thickness related information in accordance with the invention.

Figure 10:
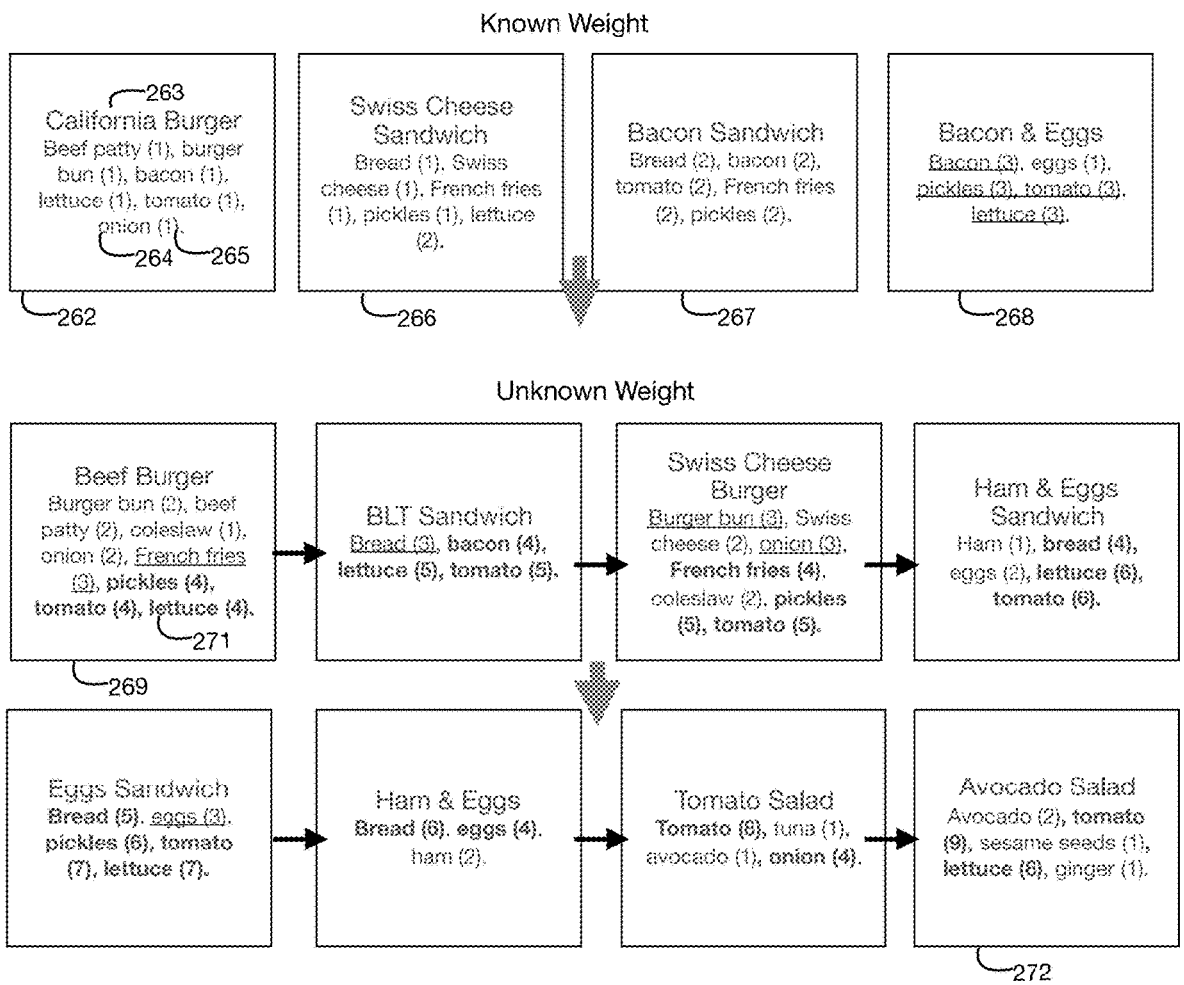

FIG. 10 illustrates an exemplary methodology for the treatment of weight information in accordance with teachings of the present invention.

Figure 11:
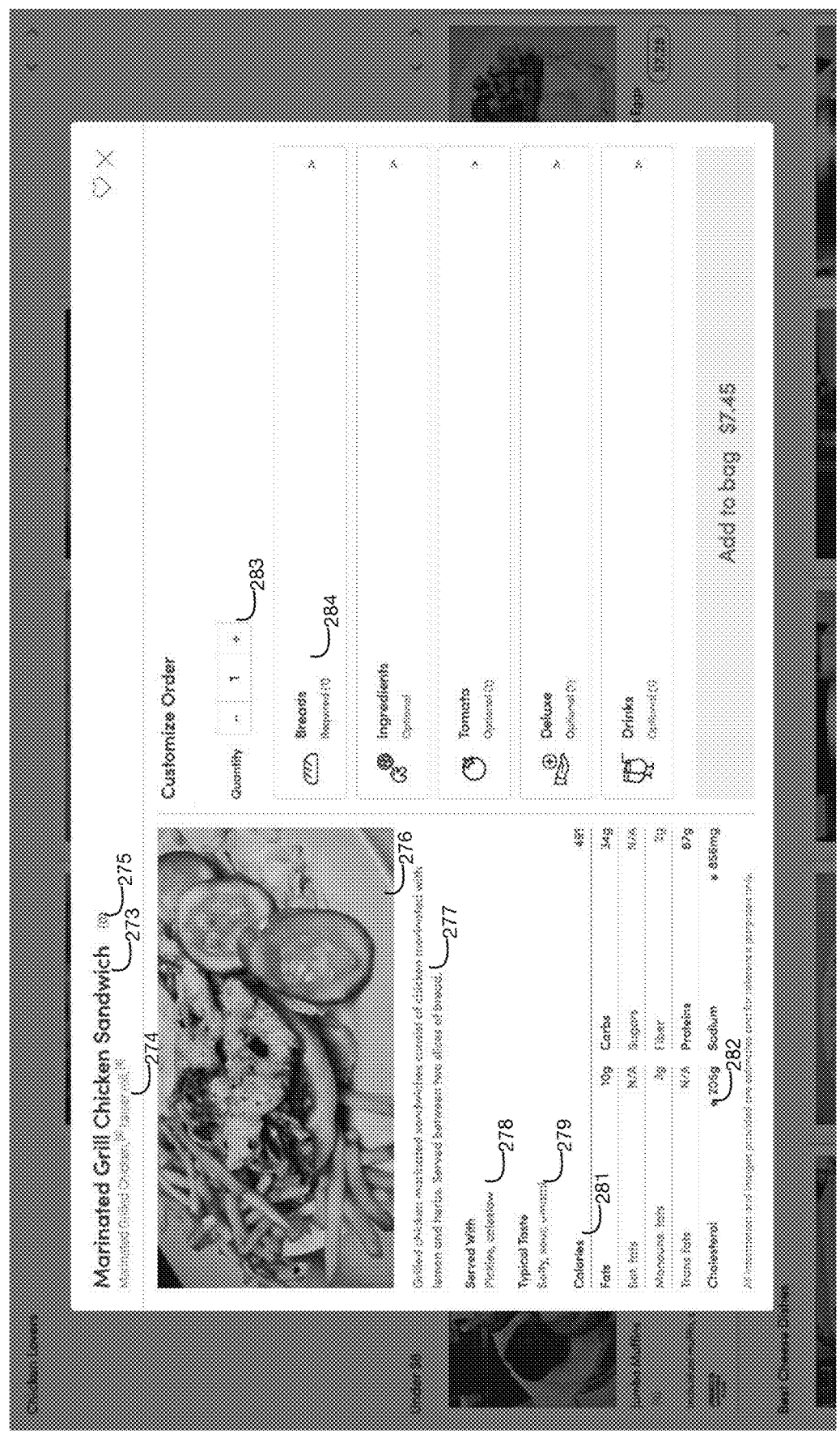

FIG. 11 illustrates an exemplary graphic user interface illustrating the teachings of the present invention.

Figure 12:
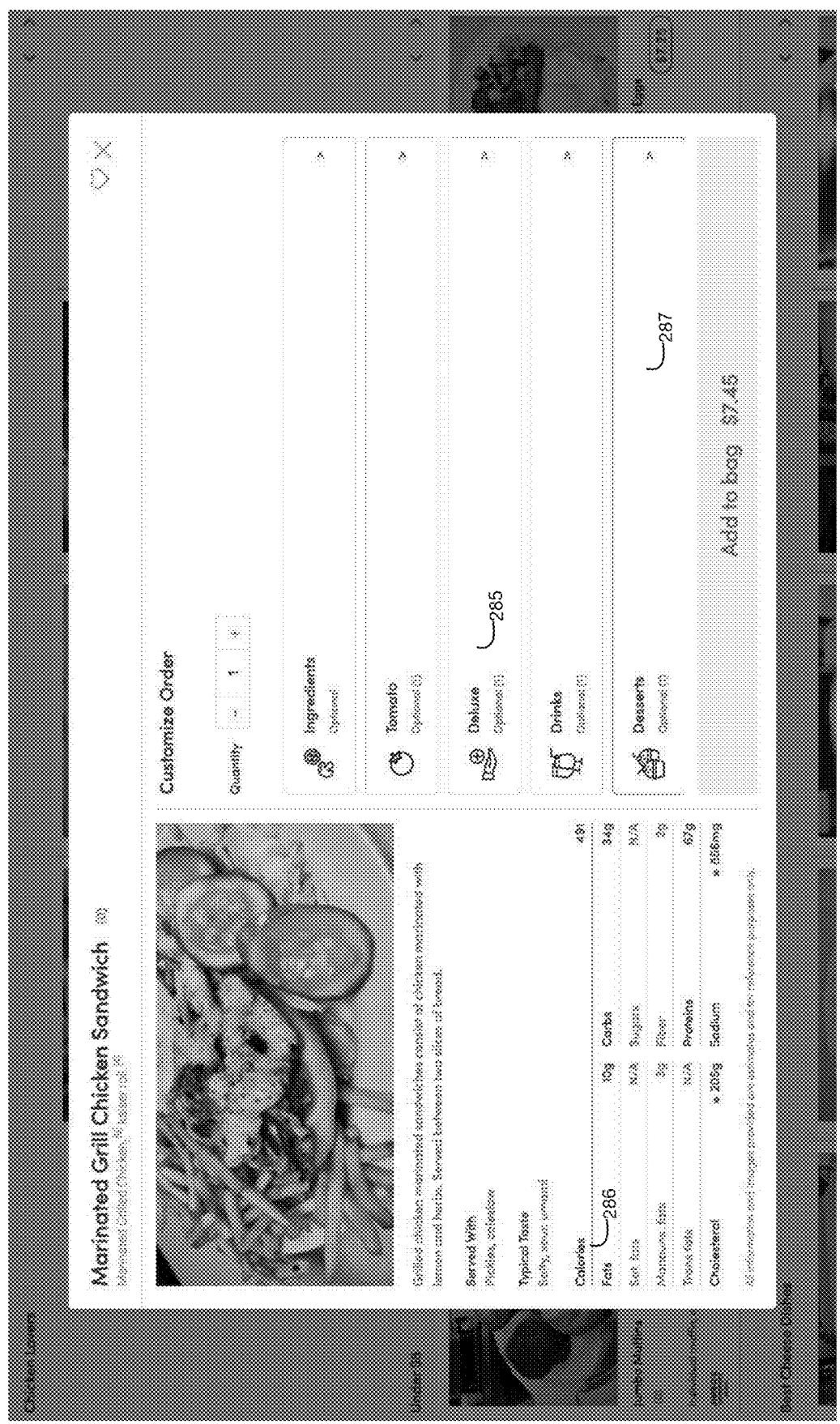

FIG. 12 illustrates a graphic user interface similar to that of FIG. 11, but including further information.

Figure 13:

FIG. 13 illustrates a graphic user interface configured to implement the teachings of the present invention.

Figure 14:

FIG. 14 illustrates yet another exemplary graphic user interface for implementing the teachings of the present invention.

DESCRIPTION OF THE PREFERRED EMBODIMENTS

Embodiments of this invention use digital photography, image processing, food volume per pixel to weight conversion, and reference weights to identify the food components and quantify the portion size served and nutritional information of the meal served at or delivered by a restaurant.

In addition to identifying the food components of a meal, such as the chicken fillet, hamburger bun, piece of lettuce, slice of tomato, pair of pickles, catchup take-out cup and fries in a chicken fillet meal, and calculating nutrition values based on perceived size and/or known nutrition values, the invention also presents the option of calculating nutrition values based upon the ingredients of a recipe for the particular food components. For example, in the case of a chicken fillet, nutrition information typically of the type displayed in USDA required "Nutrition Facts" food labeling, may be determined from known identity and weight of ingredients of the recipe. For example, this may be 100 g of dark meat chicken, 10 g of oil, 14 g of white bread breadcrumbs and 20 g of scrambled egg yolk and egg white.

In the present invention, the system generates a full report of the estimated nutritional information for an entire meal including weight of all of the components of the meal by assessing the pictures of the various order items which comprise meal taken by the customers. For example, this may include an assessment of nutrition information for a meal consisting of a cup of soup, a chicken fillet meal, a cola, a slice of cake and coffee.

Figure 1:
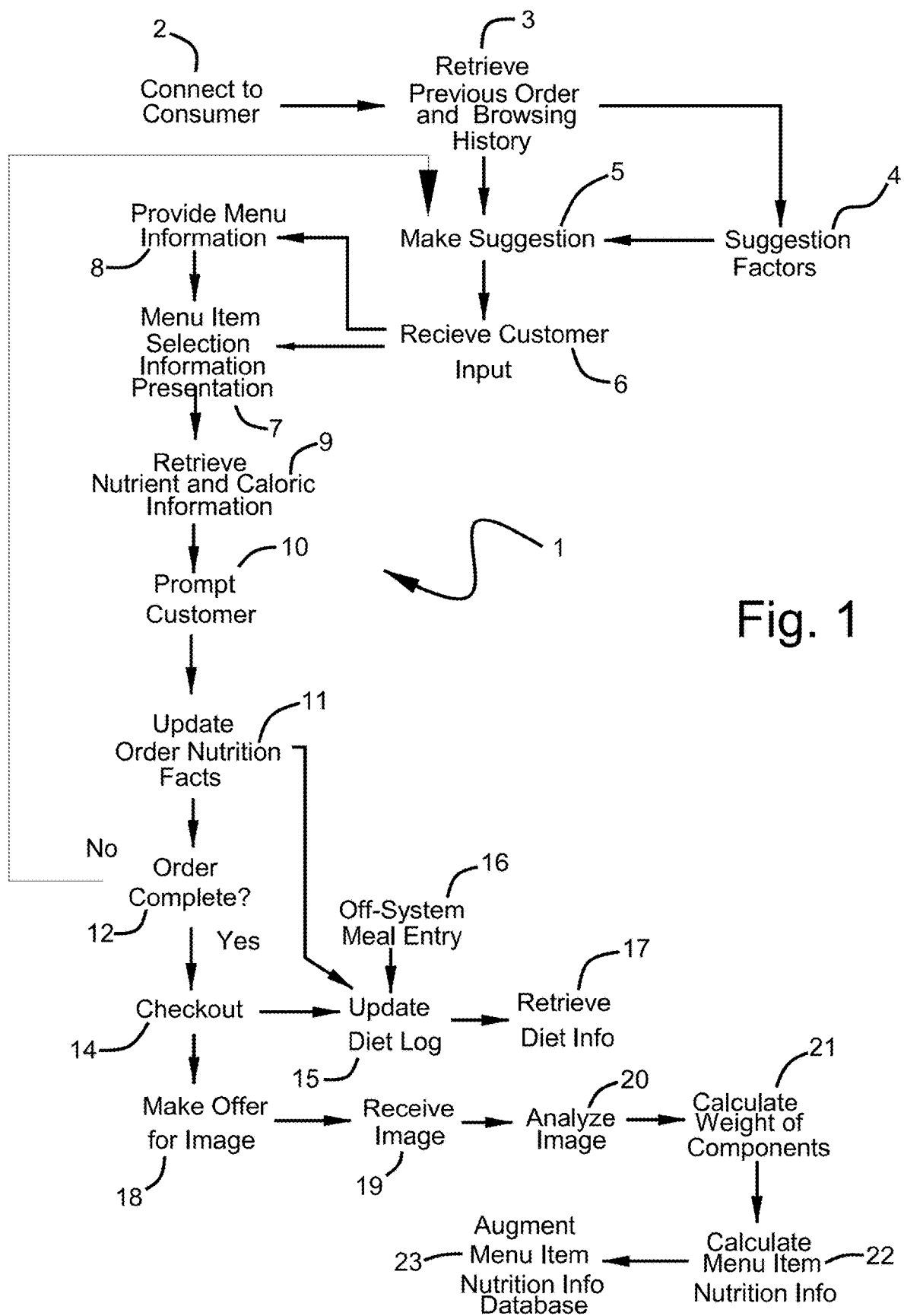
FIG. 1 is an illustration of the cloud-based infrastructure incorporating the present inventive apparatus and method.

Referring to FIG. 1, the inventive process begins with the consumer-user logging onto the website of the operator of the inventive system 1. This is done at step 2. It is noted that the inventive system is being illustrated within the context of a website, but that inventive system 1, as claimed, may be implemented in the form of an app which communicates with the server of the operator of inventive system 1. It is to be understood that the inventive version of the app may be implemented with all the process steps described in this application in connection with provision of the inventive method through a website.

Upon connecting with the website at step 2, the operator of inventive method 1 retrieves, at step 3, the previous order history of the particular consumer-user accessing the website. In addition, at step 3, the system also retrieves the browsing history of the consumer-user on the inventive website. By browsing history on the inventive website is meant information on which pages the consumer-user has previously browsed the pages of the website. Such pages may be special offer pages, pages of menus of restaurants describing to the inventive system 1, pages devoted to particular restaurant menu items, groups of restaurant menu items, and the like. The particular pages accessed by the consumer-user gives an indication of the restaurant menu items, and the types of restaurant menu items in which the consumer-user is most interested. This information is processed at step 4 into a database of suggestion factors.

Based on the information retrieved at step 3, inventive system 1 makes a suggestion at step 5 of restaurant menu item choices which the order and browsing history of the particular consumer-user indicates to be of interest to the consumer. In one embodiment of the invention, the suggestions may be limited to menu items from restaurants paying promotional fees to the operator of the inventive system 1.

After the suggestion is made at step 5, the consumer is given an on-screen option, at step 6, to either make a selection from the suggested items presented at step 5, and be presented with a page with information on the menu selection at step 7. Alternatively, the consumer may choose to be presented with a menu at step 8, for example from a number of stores on the webpage presented at step 5. Upon receiving the page for the menu, the consumer may select a particular restaurant menu item, after which the system retrieves nutrient and caloric information on the restaurant menu item selected at step 9. The customer is then prompted at step 10 to confirm his order of the restaurant menu item. This information is used to generate nutrition facts for the restaurant menu item ordered at step 11.

At step 12, the system receives a prompt respecting whether or not the order of the consumer-user is complete. If it is not complete, the system returns to step 7, where the consumer is given the opportunity to add restaurant menu items to his order. In the event of the addition of such a restaurant menu item, the nutrition facts for the entire meal, consisting of all restaurant menu items ordered, is updated at step 11. Once the order is complete, the system proceeds to step 14, where the system proceeds with the typical checkout steps employed in e-commerce. In accordance with the invention, a diet log is provided which tallies information respecting meals ordered, calories consumed, nutrition elements consumed, and so forth for later retrieval by the consumer user. Accordingly, at checkout step 14, the system updates the diet log at step 15. In addition, the consumer is given the option to input foods consumed from other sources by entering the same into the diet log at step 16. Accordingly, when the consumer-user retrieves diet information at step 17, the same is more likely to be complete.

In accordance with the invention, it is contemplated that the database used by the system will be updated by obtaining images of actual restaurant menu items ordered by the consumer user. In the present example, the system has stored the order information completed at step 14. Accordingly, the system knows what the consumer user's order consists of. Upon the completion of the order, the consumer user is sent a message at step 18 offering a discount coupon on a future order if the consumer sends an image of one or more of the restaurant menu items which were ordered by the consumer user.

After the restaurant menu items have been delivered by the restaurant, the consumer then has the opportunity to capture an image of the restaurant menu item on his smart phone or other device and send it to the operator of inventive system 1 at step 19. The image is then analyzed to determine the current content of the meal being furnished under the menu item by the restaurant at step 20. Such analysis includes computation of weight of meal components at step 21. From this information nutrition information on the meal is generated by the inventive system 1 at step 22, and the information generated for the image is stored in the database of the inventive system one at step 23.

Figure 2:
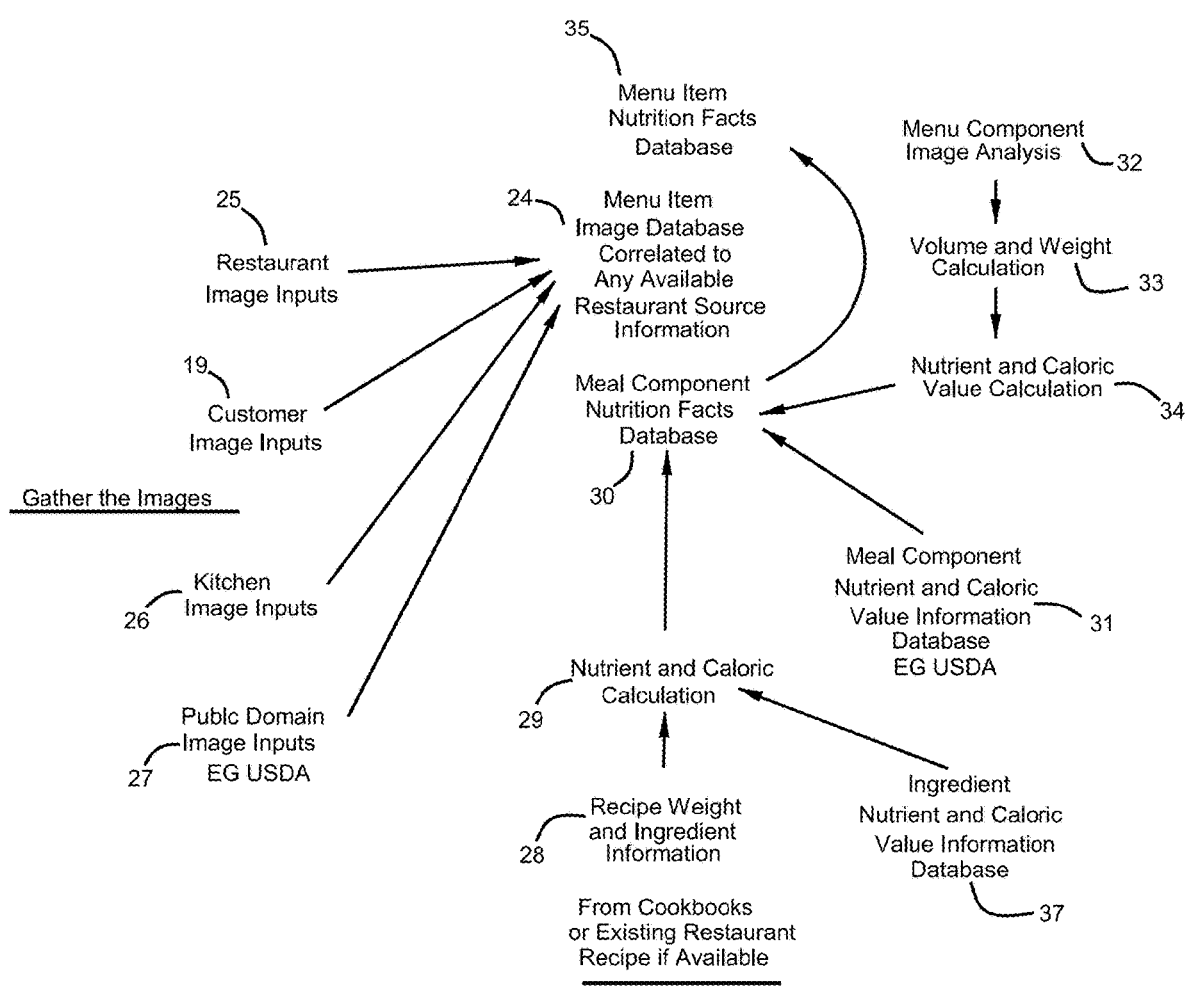
FIG. 2 is and exemplary general conceptualized illustration of a part of the inventive method.

Turning to FIG. 2, as alluded to above, the inventive system 1 works by evaluating nutrient and caloric information based upon a database of photographs and a database of such information. Generally, the image database 24 is populated at step 25 with restaurant menu item images provided by restaurants, for example images contained on their websites and paper menus. At step 19, images are collected from customers, as described above.

In accordance with the invention, it is also contemplated that a kitchen, for example a kitchen operated by the website operator, will prepare various meals based on known recipes and including various amounts of known ingredients. In accordance with the inventive method, such prepared meals are photographed at step 26 and input into the database 24. In addition, any other source of images of meals or components of meals may be input into the system at step 27. For example, these may include published photographs of meals with nutrition information provided by the United States Department of Agriculture, public domain images on the web associated with nutrition information, public domain recipe book images associated with recipe book recipes and nutrition information (including caloric information). In accordance with the invention it is also contemplated that recipe books, with their ingredient and weight information, which are used by the system at step 28, may be used to generate nutrient and caloric information in step 29, based upon the weights given in the recipes and ingredient nutrient and caloric value information retrieved at step 37. Such a food component specific nutritional information is stored in a database at step 30.

The system may also employ the retrieval of food component and/or ingredient nutritional and caloric value information from a database retrieved at step 31.

In addition, the inventive system has the capability of analyzing food component images at step 32, deriving from the images the volume and weight of the constituent components of a meal at step 33. This enables the calculation of nutrient and caloric information at step 34. Such information is stored in the system database at step 30.

The system then generates, at step 35 a database of restaurant menu items with their associated nutrition facts correlated to the source. To the extent that total nutrition facts for a particular restaurant menu item are not known, the system breaks down the restaurant menu item into a plurality of meal components, for example in the case of a chicken fillet dinner, a fried chicken fillet, a hamburger bun, a lettuce leaf, tomato slice and a pickle slice. The nutrition facts for the meal are then performed by obtaining the nutrition facts for each of the food components and taking a sum of the same which is generated at step 36 and stored at step 35.

The derivation of caloric and nutrient information from photographs will be described with reference to FIG. 3. Pictures to be analyzed, for example restaurant menu item pictures are input into the system at step 38. Such images are stored at step 39 in an image database with associated restaurant information.

The system then proceeds to generate nutrition and caloric information. In the event that the restaurant has provided a recipe to the operator of the inventive system, and that recipe includes all of the ingredients and their weight, the same is accessed at step 40. Using nutrition and caloric information stored on the database of the system for the various ingredients, the system calculates, at step 41, nutritional and caloric information and stores the same in a database at step 42.

In the event that the recipe information is available, the system proceeds to analyse the restaurant menu item image in order to derive information on the relationship between pixels and a conversion factor. The conversion allows the system to calculate nutrition and caloric information on the food items illustrated future-acquired images of unknown food weight. At a first step 56, overlapped 30×30 pixel regions of the image with a distance between the central pixel of the region and the central pixel of the next regions of 3 pixels, are transformed to color histograms. Of course, depending upon the resolution of the image, larger or smaller regions may be employed. The object is to reduce processing time to the extent that the same is consistent with accurate information.

The 30×30 pixel regions are compared to reference colors associated with specific food components stored in the component color database which is accessed at step 43. At step 44, each pixel is associated with a particular food component by comparison of the color on the image to the color in the component color database accessed at step 43.

To the extent that a color match cannot be obtained, or the color match reveals that it is not the same item as appears in the picture, as may be recognized by a manual operator or an artificial intelligence algorithm at step 57, the system allows the input of a different food component and augmentation of the component color database accessed at step 43. The result is the making available at step 45 of an image with identified food component areas. Optionally, at step 46, occulted portions of food components on the image, such as a lettuce leaf which is partially covered by a pickle slice, may be indicated on the food component list before the color comparison, thus creating a full area image of the particular food component, including the occulted portion thereof. The system calculates algebraically the convex hull for the identified pixels of the food component marked as occluded and its region of interest is then delineated on the image.

The system then counts the number of pixels in the completed food component image to obtain an area in pixels for the food component. The system then estimates, at step 75, food component thickness based upon food component weight accessed at step 40, as the same is known, the pixel count obtained at step 74 and density for the particular food component. The estimated thickness for each food component is after that stored at step 77 in the thickness database in order to be accessed when images have a lonely component. The system also has a database of conversion factors associated with food components, which is populated as described below. The conversion factors are tied to the real world by being generated based on photographs where the food components, identified pixels and their weight are known, for example where the food components were prepared in the kitchen of the system operator from a recipe. Generally, a conversion factor based on the estimated thickness at step 75, weight information from step 40 and identified pixels from step 74 are calculated at step 47 from only food images with known weight. That conversion factor is then stored at step 78 in the conversion factor database along with the amount of identified pixels by food component from step 74 and the weight from step 40. This conversion factor will allow weight to be calculated on future food images with unknown weight at step 72.

The above process is then completed for the other three food components at step sequences 49, 79 and 50, steps 51, 80 and 52, and steps 53, 81 and 54. After each of steps 50, 52 and 54, the system stores at step 78 the identified pixels, the calculated conversion factor and the weight for each food component in the conversion database in order to be used for future image analysis at step 48.

In accordance with the invention, restaurant menu item pictures input into the system at step 38 may also be used to populate databases at step 42. More particularly, using the process described above, overlapped 30×30 pixel regions of the image are transformed to color histograms at step 56. The system then proceeds to step 44 and completes the process as described above. As in the process above, to the extent that a color match does not indicate an accurate food component identification, the database may be updated or the result overridden by an operator identification input at step 57.

Yet another option in accordance with the invention is to physically obtain restaurant menu items, for example by ordering the same from a restaurant at step 58. The individual food components may be weighed at step 59 and weight information for the food component together with proportional weights of various ingredients taken from public domain cookbooks, or directly taken from the recipe of the restaurant at step 60 may use to generate nutritional and caloric information at step 77 which may be sent to the database of the system at step 42.

In accordance with the invention, pictures of the restaurant menu items obtained at step 58 are taken at step 61. Overlapped regions of the image are then transformed to color histograms, for example regions with a size of 30×30 pixels at step 56, food components identified at step 44, and pixels counted at step 74, thickness estimated at step 75 and conversion factors calculated at step 47, based upon weight information generated at step 60, in a process substantially the same as that described above in connection with restaurant menu item pictures at step 38. The conversion factor, identified pixels and estimated thickness are then stored in the databases at step 42.

As discussed above, the customer may also provide the operator of system 1 with images of actual restaurant menu items ordered from particular identifiable suppliers. Such images are uploaded to the inventive system at step 19. The system then checks its databases at step 67 to determine whether the image matches an image and its databases. If there is a match, the nutrition and caloric information associated with the matching image is associated with the customer uploaded image and put in the system database at step 68.

On the other hand, if there is no match for the system database image, the system proceeds to step 69 where overlapped 30×30 pixel regions are transformed to color histograms, then at step 85, the region color histograms are compared to the stored food component color histograms accessed at step 86. At step 70, each pixel on the image is identified as a food component. Optionally, at step 71, occluded food components may be indicated on the food component list before the color comparison. The system then proceeds to step 72 where the images are scaled using the conversion factor to derive weight at step 48 and nutrition facts at step 83 from the known food component in response to the conversion factor obtained from the database populated at step 42. The resulting nutrition and caloric information, the thickness calculation, the calculated conversion factor, the identified pixels and the weight are then stored at step 42 for each component in the different databases in order to be used for future image analysis.

If the system does not receive recipe or weight information from the restaurant at step 84, then the image will be analysed following steps 69, 85 and 70 in order to calculate the weight and nutritional information of the food present on the image. More particularly, overlapped 30×30 pixel regions of the image are transformed to color histograms. These regions are compared to reference color histograms at step 85 associated with specific food components stored in the component color database which is accessed at step 86. At step 70, each pixel is associated with a particular food component by comparison of the color on the image to the color in the component color database accessed at step 86. To the extent that a color match cannot be obtained, or the color match reveals that it is not the same food component as appears in the image, as may be recognized by a manual operator or an artificial intelligence algorithm in a manner similar to that at step 57, the system allows the input of a different food component and augmentation of the component color database accessed at step 86. The result is the making available at step 70 of an image with identified food components. Optionally, at step 71, occluded portions of food components, such as a lettuce leaf which is partially covered by a pickle slice, may be indicated on the food component list of the menu item, thus creating a full area image of the particular food component, including the occulted portion thereof. The system calculates algebraically the convex hull for the identified pixels of the food component marked as occluded and its region of interest is then delineated on the image.

At step 87, the system counts the number of pixels in the image related to each food component to obtain an area in pixels for the food component. The amount of pixels by food component will be identified at step 87 as described above. Then, the estimated thickness of each food component will be calculated based on cookbook recipes, density and identified pixels at step 88. At the same time as step 88 is being performed, the conversion factor will be calculated according to information stored on the conversion factor database at step 72. Weight is calculated at step 48 by multiplying the number of pixels counted at a step analogous to step 74, times the conversion factor and the thickness to get volume, and then the volume being multiplied by density to get the weight, which allows the duration of nutrition information, including caloric information. Once the weight by food component is known, the nutrition and caloric information is calculated at step 83. The resulting nutrition and caloric information is stored at step 42 and the thickness calculation is stored in the thickness database at step 77. The calculated conversion factor, the identified pixels and the weight are then stored in the conversion factor database at step 78. The information in these different databases is used in future image analysis.

In accordance with the invention, the method steps performed at steps 87, 88 and 48, are repeated for each food component, indicated as food components B, C and D in FIGS. 3a and 3b, resulting in the storage of corresponding information for food components B, C and D as indicated in FIGS. 3a and 3b in the database at step 78.

The capability of the inventive process to derive nutrient information for restaurant menu items from photographs, which depends upon information available to the system, will be described with reference to FIGS. 4a and 4b, which illustrate a particularly preferred embodiment of the present invention. Recipe ingredients and ingredient quantities, for a plurality of food components (such as a hamburger bun or a breaded and fried chicken fillet, or a grilled chicken fillet), may be obtained from cookbooks at step 89 and used to calculate nutrition facts for the particular food components. Alternatively, the operator of the system may use FDA supplied nutrition information for food components, such as a hamburger bun, grilled chicken fillet, or 12 ounce lemonade. In accordance with the invention, a database of components is provided and augmented at step 90.

Optionally, food components of the same restaurant menu item having different weights, such as a half pound burger or quarter pound burger may be listed in the database as different food components. This may be important where the ratios of different ingredients may change depending upon size. For example, this would be the case where both a half pound burger and quarter pound burger are served on the same hamburger bun. This component recipe will be associated, as detailed below, with related serving nutrition facts based on ingredients from publicly available nutrition information. Alternatively, such variations may be accommodated by scaling of the applicable template as detailed below.

In accordance with the invention, standard menu item templates which contain the identity of food components in each standard menu item may be provided to the restaurant operator. For example, for a bacon lettuce and tomato sandwich, the standard menu item template would include the quantity and weight of all food components, such as, in this example, the bacon, lettuce, tomato, bread and salad dressing used to make the standard menu item. The template for the bacon lettuce and tomato sandwich is then used as a starting point for a restaurant to enter their bacon lettuce and tomato sandwich into the database, and in doing so they modifying the standard menu item template to add or drop ingredients, change the quantities of ingredients and so forth. Thus a convenient method is provided for restaurants to enter their menu items into the system in a standardized fashion which can be processed by the system.

More particularly, such nutrition information is derived from USDA information, input into the standard menu item template database at step 92, and then entered into the system associated with its respective food component in the component database with its associated weight at step 91, where a standard menu item template is also created. The ingredients and quantities from the recipe are used to calculate nutrition information. Calories and nutrients of the recipe are then calculated per serving and stored at the standard menu item database at step 93. Alternatively, components associated with caloric and nutritional information, directly provided by the United States Department of Agriculture for the entire food component, may be entered into the system at step 92.

Restaurants may, optionally, provide item information to the system at step 94, as for example food component information, images, variations of recipe or cooking methods. The restaurant, an operator of the inventive system or an algorithm obtains from the standard menu item database the recipe with the closest name to the restaurant item name and derives information from the recipe and its associated nutritional information and adapts the same to the information provided by the restaurant at step 95 to obtain proportional nutritional information for the restaurant menu item. This is done for each food component of the menu item, for example the bun, fillet, lettuce and tomato in a chicken dinner menu. The restaurant menu item may thus be stored in the inventive system at step 95 associated with its nutritional information. The adaptation may consist of modifying food components, weight, total size and the variations offered such as menu item components weight. The restaurant menu item along with the information provided by the restaurant at step 94 will be stored in the restaurant menu item database at step 96.

At step 97 the system collects images related to a restaurant menu item, including images provided by the customer end user at step 98 or being obtained from the restaurant menu item database at step 96. The image analysis runs at step 99 as a tool for generating information for the restaurant menu item image from step 97 and the restaurant menu item information from step 96 as, for example, food components, recipe weight and density of each food component. Before the image analysis runs, an operator or algorithm may identify occluded food components on the image at step 113 pointing out components hidden by other components on the image at step 112.

As discussed above, overlapped regions are transformed to color histograms at step 101 and 102, for example the image divided into overlapped regions of 30 pixels by 30 pixels with a distance between each data point and the center location of the next region of 3 pixels. Each color histogram from the region is treated as a feature vector that is then compared to the feature vectors from the food component color histograms stored in the component color database at step 103. Every pixel may be included in up to eight feature vectors which are compared to the food component feature vectors from the component color database up to eight times.

The image colors compared to the reference colors from step 104 are associated with food components contained in the restaurant menu item food component list accessed through the restaurant database at step 96. At step 103, each pixel is associated with one food component from the recipe or variation at step 105.

To the extent that a color match cannot be obtained at step 106, or the color match reveals that it is not the same food component as appears in the picture, as may be recognized by a manual operator or an artificial intelligence algorithm at step 107, the system allows the input of a different food component at step 108 and augmentation of the component color database at step 109, with the operator pointing out the color of the food component on the image and associating it to a substantially matching food component in the component color database at step 108. If all the food components in the image match with a food component from the component color database, for example after augmentation, the number of pixels for the area of each food component in the image will be identified at step 111.

Once the number of pixels per food component is known at step 111, the system counts the number of food components present on the image at step 114. If the image contains only one food component, then the estimated thickness will be calculated from previous thickness values for that food component stored in the thickness database and accessed at step 115. If the image contains more than one food component, the system will calculate a reference volume/pixel value for each component at step 116 based on counted pixels from step 111, food component weight from step 95 and density information by accessing the component database. At step 117, reference volume/pixel values from the different food components are gathered and the median is calculated.

Previous to the input of information into the databases of the system, a statistical study was carried out to evaluate the median (or alternatively the average) thickness of actual restaurant food components ordered from restaurants in the United States, giving as a result an median thickness of 1 cm. The median of the reference volume/pixel values is associated to a thickness of 1 cm at step 118. Then, the system checks if the image contains more than five food components at step 119. If the image contains more than five food components, the thickness values will need to be normalized at step 121. If the image contains less than five food components, the thickness for each food component is calculated using the relationship between median thickness (1 cm) and the median reference volume per pixel value of the food components on the image at step 122. Preferably, a survey is done specific to each food component.

At step 123, the system checks if there are more than two food components from step 105 with at least three conversion factors each stored in the conversion factor database. If there are not enough conversion factors stored in the conversion factor database in order to carry out the calculation, the system will need to analyse more food images with known weight at step 124 to expand the number of food components with more than three conversion factors in the conversion factor database at step 125. If at least two food components have more than three conversion factors stored each in the conversion factor database, then the system will use that information along with stored pixels and weight to create a linear regression at step 126. More particularly, "x" is the relationship between pixels and weight of previous analysed images and "y" the conversion factor of previous analysed images. Using the pixels identified for the food component at step 105, and the weight from the food component list at step 95, a conversion factor is generated for the food component at step 127. As long as the scale from the image to the real world is the same for all the components, the system calculates the median of the conversion factors of the food components present on the image at step 128, generating a unique conversion factor to be applied to all the food components of the image at step 129. The resulting conversion factor and the pixels of each food component are then stored in the conversion factor database at step 131 in order to be used on the next analysis.

The pixel count for each food component from step 111, the estimated thickness for each food component at step 122 and the conversion factor generated at step 128 are then used to calculate the volume of the food component at step 131. Volume is the result of pixels multiplied by the conversion factor and multiplied by the thickness. After that the system accesses the component database to get the density at step 132. The density is used by the system to convert the volume of each food component to weight in grams at step 133. The weight of each food component is stored in the conversion factor database at step 131 in order to be used in the next image analysis.

At step 134, the weights of the food components are added to calculate the total restaurant menu item weight. This information can be displayed to the user at step 135. The nutrition calculation of the restaurant menu item is carried out at step 136 accessing to the weight information from step 133 and the nutrient information per 100 g from the component database. The full process is repeated for all the images of the same restaurant menu item, thus processing all components of the restaurant menu items. In accordance with the invention, after each analysis, the average calories and nutrients of the restaurant menu item is recalculated as can be seen at step 137. Finally, nutrients and calories are displayed at step 138 to be checked by the consumer end user who is ordering the meal and the suggestion factors are updated at step 139.

The process to scale images using conversion factors will be described with reference to FIG. 5. The system collects images provided by the operator of the inventive system at step 141, and collected, for example from restaurants at step 142 and from end-user consumers (taken after an ordered restaurant menu item has arrived to ensure the accuracy of information provided notwithstanding the passage of time since information on the restaurant menu item was last collected, or factors other than the passage of time) at step 143. Physically obtained images taken by system operator at his kitchen or from official sources as the United Stated Department of Agricultural at step 141 are optionally provided to the system along with the weight of the food components at step 144. These images and the related weight of the food components, for example derived as described above, may be used to create new entries in the standard menu item database at step 145. The standard menu item database provides images and name of the food components to the system in order to identify pixel-groups through image segmentation at step 146 and 147, as previously described in detail. Food components are identified on the image and pixels are counted at step 148. Thickness is then estimated for each food component at step 149 being based on the pixel count of each food component from step 148, the weight of the food components provided by operators at step 144 and the density provided by the component database at step 151.

The conversion factor (CF) is a constant for transforming pixel count information into centimeters As can be seen below, the CF embodies the relationship between pixels, thickness, weight and density:

$$\text{Density}(g/cm^3) = \text{Weight}(g)/\text{Volume}(cm^3)$$

$$\text{Density}(g/cm^3) = \text{Weight}(g)/((\text{area}(px)*CF)*\text{Thickness}(cm))$$

At step 152, the conversion factor is calculated for each food component and is based on the density accessed at step 151, the weight provided at step 144, the pixels identified at step 148 and the thickness estimated at step 149. As long as all the food components of an image have the same conversion factor, the median of the resulting conversion factors of the food components in an image is calculated at step 153. At step 154, the median conversion factor is stored in the conversion factor database individually for each food component along with the weight and the pixel count. As an example, the median conversion factor, weight and pixel count of food components from step 148 are stored individually in the conversion factor database at steps 155, 156 and 157.

Alternatively, separate conversion factors for each food component may be stored and utilized within the system of the present invention.

In the event that a restaurant provides the weight of the food components or the recipe of a restaurant menu item, the standard menu item template from the standard menu item database at step 158 is adapted to the restaurant information and stored in the restaurant menu item database at step 159. End user restaurant customers may also provide food images of restaurant menu items at step 143. If the restaurant menu item food component list has been provided by the restaurant at step 142, then the image is analysed at step 163, however, if the restaurant menu item food component list has not been provided by the restaurant at step 142, then the image will need to be analysed at step 164 if the real weight of the food components is not known. At step 166, the system gets images, food components and weights from the restaurant menu item database accessed at step 159 and then the system follows the same previously described steps in order to calculate the median conversion factor, namely, steps 146, 148, 151, 149, 152 and 153. At step 154 the median of the conversion factors and the weight and pixels of each food component are stored individually in the conversion factor database.

In the event that the restaurant does not provide a customized standard menu item template, either by modifying an existing standard menu item, but a restaurant or a user provides an image of the restaurant menu item, the system will use the list of food components from a cookbook recipe (or optionally another source) accessed at step 158 to analyse the image through image segmentation at step 164, which is analogous to step 146 and is followed by steps which are also similar. After the color comparison, food components on the image are identified and pixels are counted at step 165. Thickness is then estimated at step 167 being based on the pixel count for each food component from step 165, the weight of the food components provided by the standard menu item database at step 158 and the density provided by the component database at step 151. At the same time, each food component of the restaurant menu item sends a request to the conversion factor database at step 168 to get a conversion factor value according to the pixel count from step 165 and the weight of the food component on the cookbook recipe from step 158.

At step 169 a linear regression is created with the weight, pixels and conversion factors stored for each food component in the conversion factor database at step 154. "x" is the relationship between pixels and weight of each food component and "y" is the conversion factor values. This regression is created with the aim of comparing the relationship between pixels and weight of other images containing the same food component. It allows the system to avoid problems related to the orientation of the camera, taking into account that depending on the orientation of the camera, the pixel count is different for the same weight of the food component. Also, the difference in the relationship between pixels and weight will give an idea about the conversion factor to be applied on the image. At step 171, the system generates a conversion factor for a food component according to its regression, being "x" the counted pixels from step 165 divided by the cookbook weight accessed at step 158 and generating a conversion factor "y".

It is noted that in accordance with the present invention, the angle of the camera taking the picture can be compensated for keeping in mind that the angle is constant for all food components, or single food component, and information respecting the weight of the same, or, an artificial intelligence evaluation indicating the identity of the same to a known meal allows proportional adjustment.

In order to create the linear regression, it has been verified that it is desirable to have at least three conversion factors stored in the conversion database for the food component. For that reason, at step 160, the system will not be able to calculate the conversion factor, as long as the are only two stored conversion factors for food component five.

At step 172, the median of the conversion factors generated at step 169 for each food component is calculated. The median of the conversion factors is calculated with the conversion factor generated for food component two at step 170 and the conversion factor generated for food component one at step 171, as long as the conversion factor for food component five will not be generated for insufficient conversion factors for that food component as can be seen at step 180. This median conversion factor is applied to all the food components of the image including food component one, food component two and food component five in order to transform pixels to cm at step 173.

At step 174, the volume of each food component is calculated from the area in cm calculated at step 173 plus the estimated thickness from step 167. Then, accessing the component database to get the density for each food component at step 151, and getting the calculated volume from step 174, the system calculates the weight for each food component. The calculated weight and the identified pixels are stored for each food component in the conversion factor database at steps 176 and 177. The median conversion factor is also stored in the conversion factor for each food component of the meal at step 178. At step 180 it can be seen that the amount of images that provided information about food component number five increased one time. The information from the four evaluations stored in the conversion factor database is used to create a linear regression at step 169 for the next image analysed that contains food component five.

At step 179, another image provided by the user or restaurant at step 162 is analysed. Food components are identified and pixels are counted at step 181. This time, the system can provide a conversion factor for food component five in an analogous step 170 as long as after step 178, food component five has stored in the conversion factor database at least three conversion factors as can be seen at step 180.

At step 182, another image provided by the user or restaurant at step 162 is analysed. Food components are identified and pixels are counted at step 183. However, conversion factors are not generated at step 184 as long as food component four and food component six only have a conversion factor stored for each food component. At this point, an operator or algorithm may analyse a few physically obtained images at step 141 that contain food components four and six.

Once the weight of each food component is calculated, the weight of all the food components is added and the nutrient and caloric information is calculated in order to be displayed to the user.

A particularly advantageous method for estimating the thickness of the food components in accordance with the invention will be described with reference to FIG. 6. More particularly, at step 185, food component information including nutrients, calories, household measures, standard weight and density per food component are provided to the component database. This information may be obtained from, for example, the United States Department of Agriculture at step 186. In some situations in which the density is not provided, the density may also be calculated according to common household measures (for example from a recipe) using the equivalent weight, or in the event that the household measures are not available, according to the food component content and known density (glucose, starch, cellulose, protein, fat, salt, citric acid and water). Food component lists and related servings are obtained from cookbooks at step 188 and then standard menu item templates are created at step 187 associated with food components from the component database.

The content of the standard menu item template, as referred to in the specification, comprises recipe ingredients, ingredient weights, recipe servings, nutrient and caloric information and household measures.

Generally, standard menu item templates are used by restaurant operators to generate their own restaurant menu item entries by modifying the template and by the system to analyze images, as detailed herein.

Restaurants may provide restaurant menu item information to the system at step 189, as for example food component information, images, variations of recipe or cooking methods. At step 191, the user or an operator may also provide images of the restaurant menu item. At step 190, the restaurant, an operator or an algorithm will select, from the standard menu item database, the recipe with the closest name to the restaurant menu item name and will adapt that component list to the information provided by the restaurant at step 189. The adaptation may consist of modifying food components list, weight, total size and the variations offered (such as hamburger weight, number of chicken nuggets, volume of French fries container, French fries with hot sauce, small French fries, spicy French fries, large spicy French fries, etc). Step 189 is optionally included in the inventive system.

The image analysis runs at step 192 for restaurant item images obtained at steps 189 and 191. Each image is analyzed individually. Overlapped regions of the image are transformed to color histograms at step 192 and 193, optionally with a size of 30×30 pixels and a distance between each data point and the center location of the next region of 3 pixels.

Each 30×30 pixel color histogram is then treated as a feature vector that is compared to the feature vectors from the food component color histograms stored in the component color database for each food component at step 194. The region colors compared to the reference colors from step are associated with food components contained in the restaurant menu item food component list recipe accessed through the restaurant menu item database at step 190. In this manner, as in the other embodiments, food components are identified by their color.

Even if food components are in the same color family, comparing the color feature vectors, the system uses color sufficient to differentiate the all of the green of a pickle from the bright unsaturated green of iceberg lettuce which in turn may be differentiated from the relatively saturated green of romaine lettuce, as compared to the even more saturated green at the edge of a cucumber slice. In connection with this, it is noted that the system of the invention contemplates a database in which different parts of a particular food component may be recognized separately and information with respect to their spatial relationship to each other also saved on the system, for future component recognition. Thus, the system may store pale whitish green as a color associated with the center of a fresh cucumber slice, and deeply saturated dark green as a color associated with the periphery of the fresh cucumber slice.

Returning to FIG. 6, at step 195, each pixel is associated with one food component from the restaurant menu item food component list or variation. The system counts the number of food components present on the image at step 196. The number of pixels for the area of each food component in the image is counted at step 196.

At step 197, a reference value for each food component is calculated in order to sort components by thickness. The reference volume per pixel value is based on the cookbook/restaurant food component list weight accessed at step 190 divided by the food component density accessed at step 185 and divided again by the counted pixels for the food component at step 196:

Ref Volume/$px(cm3/px)$=(Reference Mass($g$)/Density ($g/cm3$))/Area($px$)

CFood components with a low volume per pixel value are expected to have a lower thickness, while food components with a high volume per pixel value are expected to have a higher thickness. The median for the Ref. volume/px values of the food components identified on the image is calculated at step 198.

In addition, the system may optionally use weight information to guide the thickness determination, optionally in conjunction with artificial intelligence algorithms, as well as other information in the system.

Previous to the design of the system, a statistical study was carried out to evaluate the average thickness of real restaurant food components in the United States, giving as result a median thickness of 1 cm. Based on this, the median of the reference volume/pixel values is estimated at a thickness of 1 cm at step 199. Then, the thickness for each food component is calculated through an assumption according to the relationship between the median of thickness (1 cm) and the median of reference volume/pixel values. At step 201, a thickness value is generated for each food component and stored in the thickness database along with the counted pixels at step 202. Pixel count and associated thickness are stored individually for each food component in the thickness database.

The method of estimating thickness for each food component will depend on the number of food components identified per image. It has been learned that for images with 2-5 identified food components, for example as at step 203, the thickness can be calculated, as described herein, as implemented at steps 196, 197, 198, 199, 201 and 202.

However, it has been learned that for images with more than 5 identified food components as at step 204, the thickness is desirably calculated according to the regular assumption method following steps 196, 197, 198 and 199 and after that a normalization of the thickness is desirably done at step 205. The value for the normalisation is calculated according to the differences between the real thickness of food components and the estimated thickness of food components on images with more than five food components. After step 205, the thickness value for each food component is generated at step 206 and stored in the database along with the pixel count at step 202.

For images with a single food component as at step 207, the thickness assumption method cannot be applied because the median of the ref volume/px values would likely coincide with the value of the only food component. This situation occurs in the case of food mixtures (such as a dressing) bakery products, drinks and soups (where height or diameter would stand in for thickness), many a la carte items, etc. The number of pixels for the food component is counted at step 208 after steps 192, 193, 194 and 195. The system then sends a request to the thickness database at step 209 in order to get a thickness for the only food component. In that request, the system needs to provide the counted pixels. At step 211, the system creates a linear regression with the stored information for each food component, being "y" the counted pixels and "x" the thickness value. The system generates a thickness value at step 212 according to the linear regression and the counted pixels.

The resulting thickness values from steps 201, 206 and 212 may be used in accordance with the methodologies described herein to calculate the conversion factors and food components volume in later steps in order to finally get the caloric and nutrient information of each food component as can be seen in steps 213, 214, 215 and 216 in a simplified manner.

The process of populating the component color database, which can be done by the analysis of images, for example images collected from restaurants or gathered from public domain sources, or, alternatively images of food components created by the operator of the system, is described with reference to FIG. 7.

In accordance with the invention, nutrient information may be obtained by different methods. For example, for certain food items, such as a hamburger bun, it may be convenient to go to the United States Department of Agriculture database to obtain nutrient and caloric information. Alternatively, the ingredients used in the preparation of a food component (e.g., a breaded and fried chicken fillet, or a side of creamed spinach) which is part of a full meal menu item are, optionally, obtained from cookbooks at step 55. Next, standard menu item food component templates are created, which list each of the food components of the meal and their weight (e.g., ¼ lb. burger, medium size bun, ketchup pack, and four oz. fries). Such information may be obtained from a variety of sources and are used to populate a plurality of standard menu item templates. The templates may then be used by restaurants as a starting point for accurate information associated with a restaurant menu item by the operator amending the template accurately reflect a particular menu item, for example by scaling based upon the quantity of each food component and perhaps by removing a particular food component from the template. In accordance with the invention, it may also optionally be provided to enable the addition of a food component to a template by adding in information from a food component database having food component weights and associated nutrition information. In accordance with the invention, nutrition information is scaled to any change in the weight of the food component actually being furnished by the restaurant for a particular menu entry. In accordance with the invention is contemplated that the database of the system will include information specific to every restaurant menu item being offered on the system by every restaurant subscribing to the inventive system. Nevertheless, it is recognized that new restaurant menu items, daily specials, restaurant menu items which the operator of the restaurant does not wish to include on the inventive system or, for some other reason is not included on the inventive system, will not be on the system or accessible to consumers.

More particularly, the restaurant menu item template is developed by performing the following steps by way of example, with respect to pancakes, which comprise flour, milk, eggs, oil, sugar, baking powder and salt. In particular, one would attempt to be comprehensive in putting together the template. Thus all likely options would be included. In this case, the template would include the food components comprising pancakes, fruit preserves, fruit jelly, maple syrup, butter, sausages, bacon, and so forth, together with a weight for each food component, as well as nutrition information for all of the food components in the template. This would enable the restaurant to select those food components which are applicable to its offering. The template also enables the restaurant owner to vary the quantities of each food component which allows scaling of nutrition information.

Thus, restaurants may provide food component information to the system at step 219, as for example type of food components, weight of the food components or variations of the food item component list. The recipe templates are then adapted to the information provided by the restaurant at step 219 and stored in the restaurant database at step 221. At step 222, users or operators may provide additional information to the restaurant database as for example images, size, food components, etc.

At step 223, restaurant menu item images accessed at step 221, are resized to 300×400 px and converted to 8 bit RGB color scale, comprising 512 different colors. Not converted images may have millions of colors and in order to identify food components, the system would need a high amount of food component color histograms stored in the component color database to identify food components on the image. Therefore, this step is required to speed up the system and to standardize the images provided by restaurants and users. Overlapped 30×30 pixels regions are transformed to color histograms at step 224 and 225, as discussed above, with a distance between each data point and the center location of each region of, optionally, three pixels. Each color histogram is then treated as a feature vector that is compared to the feature vectors of the color histograms stored in the component color database for each food component at step 226. The component color database comprises color histograms taken from previous analysed images and classified by food component. The region colors from step 224 compared to the reference colors from step 226 result in an association between food components on the image and food components contained in the menu item food component list ("component list") at step 227 accessed from the restaurant menu item database at step 221.

Histogram colors from the food components of the component color database are compared with the histogram colors of the 30×30 regions from the image at step 228 and the probability of those regions to be a food component is calculated. After that, each pixel is associated with a food component and the regions of interest of the food components are identified on the image at step 229. Pixels are then counted for each food component on the image at step 231. Food components from the menu item food component list with a very low amount of counted pixels or no counted pixels on the image will not be identified as a food component, as for example the food component five from step 232. This means that the image does not contain that food component. In addition, food component lists are composed of food components from the standard food component list and food components that may be part of the food component list variations. Some identified food components on the image may not be included in the restaurant menu item food component list but will be included inside food component list variations as at step 233. At step 233, food component one is a substitute of food component five in the menu item food component list. The color histograms of the variation food components will also be compared to the color histograms of the 30×30 pixel regions on the image and in the event that the probability of being an ingredient is high, pixels will be counted at step 234 after steps 223, 224, 225, 228 and 229.

In the event that an operator or algorithm recognizes a food component whose pixels have not been counted on the image at step 235, the operator or algorithm may be programmed to detect the same at step 236 and associate the color on the image to a food component of the menu item food component list provided at step 227. As an example, if pixels for food component two have not been counted at step 235 because the feature vectors of the color histograms of the food component stored in the component color database do not coincide with the feature vectors of the color histograms of the image, the operator or algorithm may associate food component two to the colored area of the image that comprises food component two at step 237. In that way, the additional colors for the food component will augment available information at step 238 and the new color histograms will be stored in the component color database at step 226. A maximum of 100 feature vectors are stored in the component color database for each food component. K-means clustering is applied to remove repeated feature vectors for each food component stored in the component color database. It reduces the heterogeneity of the stored colors. If the system repeats the feature vector comparison of the color histograms from step 228 after steps 236, 237 and 238, food component two will be identified at step 229 and pixels will be counted at step 235. Also, the new color histograms added to the component color database after step 238 will be used for the next image analysis containing food component two.

In connection with the inventive process it is contemplated that alphanumeric menu information identifying the food components of a meal, for example as may be found on a webpage of the restaurant, will also be used by the system algorithm to assist in food component identification.

The pixel count is relevant at later steps as long as it is used in the thickness calculation which corresponds to step 239, the volume calculation of step 241 and the conversion factor calculation of step 242 using the methods already described above. After the volume is calculated, weight is estimated at step 243 and then the nutrient and caloric information is calculated at step 244 through methods already described above.

As noted above, the present invention utilizes food weight image software as a tool to measure food weight through images of food taken by customers and restaurants. The tool uses matching learning at different steps to improve after every evaluation. The object of the inventive methodology, as detailed herein, is to make an estimation of the weight of the food components present on a restaurant menu item as well as the total weight of the restaurant menu item with a deviation on all those measures of 0-20%. This enables an estimation of nutrition information. As noted above, the system does not need to know the real dimensions of an object present on the image to provide good results. Common objects used as reference by other systems are: plate diameter, tablecloth draws, spoons, thumbs, etc. The system uses the information which it produces to provide approximated weight and nutrients and calories for each restaurant menu item and for restaurant independent, inventive system operator research on regular food portion sizes eaten by costumers. This information will be an aid restaurant patron end-users and restaurants in order to improve the service and experience, an aid for the algorithm to make recommendations and an aid in the knowledge of current food portions in the population. The software described above comprises a set of tools that recognizes food components on images from a preset list, it identifies food components areas, estimates food component thickness and calculates total weight of the restaurant menu item. Operator intervention in the analysis of images is facilitated by a conventional dashboard graphic user interface connected to the front end of the website, so it makes evaluations at the same time that the operators, restaurants and users add images and create new menu items for the restaurant. The tool gets information from six databases and at the same time it provides new information. The tool along with the 6 databases conform the system, as described herein. FIG. 8 describes the relationship between the six databases and their input/output functions in relation to the tool. The six databases connected to the tool are: a component database, a standard menu item database, a restaurant menu item database, a component color database, a thickness database and a conversion factor database. These databases provide the necessary information for the tool to identify food components on images. In the same way, the tool provides the necessary information for some of the databases to grow and improve, also known as machine learning. The component database contains a list of food components with stored information for each of them. Some examples of food components are: burger bun, lettuce, bacon, cheese, french fries, onion rings, beef patty. The stored information includes nutrients, calories, density, household measures and standard weight among others. Nutrients and calories values are, for example, stored per 100 g of the food component. The food component information is mainly obtained from cookbooks or from the USDA, however some information as density may be calculated at this step from household measures or nutrient values. This calculation will be explained in later stages. Alternatives achieving similar objectives may be used, for example based upon recipes and cookbooks The function of the component database is to provide information to the tool at step 246 and to the standard menu item database at step 247.

The standard menu item database consists of a wide list of food menu items with stored information for each of them. Some examples of food menu items are: lentil soup, BLT sandwich, cheese burger, caesar salad, ham omelette, and a hot dog. The stored information for each of them includes a list of food components and weight or household measures of each food component, total weight, number of servings, nutrients and calories per serving, standard weight of the servings and density. The list of food components and related weights or household measures are obtained from cookbooks as well as the number of servings. The list of food components obtained from the cookbook is associated to food components from the component database at step 245 and the corresponding weight is entered for each of them. The standard menu item database is used to calculate nutrient and caloric information according to the food components list and related weight or household measures. That information divided by the number of servings is stored in the standard menu item database at step 247. The standard menu item database also calculates the total weight of the food menu item adding the weight of all the food components in the list. The standard weights of the servings are obtained from the USDA website. Some examples are: small serving, medium serving, large serving, cup, box. The density may be obtained from the USDA website or calculated according to nutrients. The density calculation will be explained below. The resulting food menu item is used as a standard menu item template which information will be adapted by the restaurant or an operator at step 248. At step 247, operators of the system may also enter a food component list with known weight and image in order to be analysed by the tool at step 246. The resulted information may be used to feed the component color database, the thickness database and the conversion factor database. The restaurant menu item database is a list of restaurant menu items and related information classified by restaurant. Some examples of restaurant menu items are: lentil soup, BLT sandwich, cheese burger, caesar salad, ham omelette, hot dog. The stored information for each of them includes a list of food components and weight or household measures of each food component, images, total weight, nutrients and calories per serving and density. An algorithm, an operator or the restaurant selects a standard menu item from step 247 with the closest name to the restaurant menu item and optionally may provide or adapt the existent information at step 248. Some of those adaptations may consist of a modification of the food component list, a modification of the weight of the food components, a modification of the total weight, the creation of variations of the restaurant menu item (flavor, size, substitutes, preparations) or addition of restaurant menu item images. The image along with the food component list and weight is provided to the tool at step 246 in order to run the image analysis. If the restaurant, operator or algorithm does not make any modification on the standard menu item template, the image along with that information is provided to the tool at step 246 to be analyzed.

The component color database stores color histograms from small colored pixel regions from images for each food component present on the component database analyzed at least once on images. These color histograms are added to the component color database by an operator or algorithm through the tool if one of the food components on the image does not have enough color information stored in the component color database at step 249. Color histograms are treated as feature vectors, and repeated feature vectors are removed for each food component. The color information of the food components present on the restaurant menu item food component list is provided to the tool at step 246. The tool uses the color information from step 249 to compare it with the colors of the image and identify food components. The component color database grows as much as the tool is used and therefore the component identification on images will also be improved as much as the tool is used and constitutes a machine learning functionality.

The thickness database is a database in which the thickness values estimated by the tool and counted pixels after analyzing images are stored at step 251 classified by food component. This database grows after every image analysis made by the tool, therefore, the thickness database is improved as much as the tool is used (Matching Learning). The function of this database is to provide a thickness value to the tool if the analyzed image contains a single food component.

The conversion factor database (cony factor database) is a database in which the value of the estimated relation between the real world (cm) and the image (px), the counted pixels and weight are stored classified by food component. After each image analysis, the resulted conversion factor is stored in the conversion factor database at step 252 to be used in the next image analysis containing the same food component. Therefore, it improves as much as the tool is used by way of a machine learning function.

In connection with this, it is noted that, optionally, information on scale may be estimated by associating an image, the shape of the food component in the image, and known weight information to calculate the relationship between pixels and real-world area. The same can be done by scaling images of new restaurant menu items of a particular weight to images of known weight. Shape or other artifacts on the image may be used to guide the accuracy of a particular scaling.

In order to run the conversion factor database the first time, a few food item images with known food component list and related weight may need to be analyzed by the tool. The reason is that to generate a conversion factor a reasonable accuracy, the conversion factor database is best addressed with at least two food components from the image to have three previous stored conversion factors each.

The process starts with the manual selection of a standard menu item template for the new restaurant menu item from the standard menu item database and creation of all the variations offered for the item. Then optionally, an operator or algorithm may select the occluded components (overlapped components) on the image and after that step, the tool may be run automatically. This approach ensures that the tool will identify food components, and will also estimate the food component thickness and volume, all of this through machine learning. Using stored component densities calculated through different approaches, the volume is converted to weight. In a final step, the resulted estimations are saved into the different databases as a feedback.

The first step consists of the creation of a new restaurant menu item by an algorithm, operator or restaurant. An image of the restaurant menu item needs to be provided by the user, restaurant or operator and an existing standard menu item template from the standard menu item database, for example, one with the closest name to the restaurant menu item needs to be selected. Then optionally, the restaurant or operator may adapt the information of the standard menu item template to the characteristics of the restaurant menu item.

Restaurant menu items are sold with different options of flavor, size, components, preparations, etc. These variations are different for each restaurant, and for that reason, the different variations that the image may contain according to size and food components are best included by the restaurant or operator in order to improve the results of the tool. However, this step may be optional.

Once the restaurant menu item is created, an operator or algorithm may point out occluded food components on the image. It improves the recognition of the area of the food component when the food components are overlapped by other food components.

The tool uses the list of food components contained in the restaurant menu item and the food component color histograms stored in the component color database to identify areas of food components on the image. The tool transforms the pixels from the overlapped 30×30 pixel regions into histogram information. Then the system uses color analysis taking as reference the previous color histograms for a food component stored in the component color database and calculates the probability of one 30×30 pixel region of the image of being that food component. The region size used to compare the color of the components is 30×30 pixels. After this analysis, the tool identifies the regions of interest (ROI) for the corresponding food component through draws that can be manually modified in the first evaluations in order to improve the identification. For the first evaluations, the ROIs will not be so accurate, which may be addressed by modification of the draws. However, after several evaluations, the component color database will have grown and the tool will be able to identify more precise areas. For the food components pointed out as occluded, the tool identifies pixels with a high possibility of being an specific food component. After that, the system calculates algebraically the convex hull for those pixels and the region of interest of the food component is created. Food component identification will require manual help at the beginning of operation of the inventive system, while a sufficient number of histogram colors is added to the component color database but after a few evaluations, the tool is able to identify food components properly with no need for manual action. The component color database will grow after each analysis, achieving further machine learning.

The density information is obtained in base of a decision tree. Firstly such information may be obtained from official sources and scientific research. Alternatively, standard household measures (for example, from recipe books) and the equivalent standard volume may be used. Where the standard weight of the food component and the standard volume of the household measure are known the standard density may be calculated. A third approach is to calculate ingredient density according to its composition in fats, proteins, water, starch, glucose, sucrose, cellulose, salt, citric acid or other components.

Once the tool has identified the ROIs for each food component, it uses the estimated food component thickness to convert 2D regions to 3D. In order to estimate the food component thickness, we suppose that food components with a low reference volume per pixel value will have a lower thickness, while components with a high reference volume per pixel will have a higher thickness. In order to calculate the reference volume/px, the tool uses the reference weight (mass) of the food component contained in the standard menu item template or in the restaurant menu item and the stored density to estimate a possible reference volume for each food component present on the image. That reference volume is then divided by the number of pixels that the food component occupies on the image (area) in order to generate a reference volume/pixel value for each food component.

Estimated volume$(cm^3)$=Reference mass$(g)$/Density $(g/cm^3)$

Reference Volume Value$(cm^3/px)$=Estimated Volume $(cm^3)$/Area$(px)$

Reference Volume Value$(cm^3/px)$=(Reference Mass $(g)$/Density$(g/cm^3)$/Area$(px)$)

Example 1

Consider that food item 1 is a BLT Sandwich and that the standard menu item food component list for this food item is:

Bacon (20 g), lettuce (10 g), tomato (20 g) and bread (50 g).

Also, the tool has already identified food components on the image counting the following amount of pixels for each food component:

Bacon (120 px), lettuce (200 px), tomato (50 px), bread (200 px).

Therefore, the reference volume value per pixel for bacon taking into account 0.61 g/cm3 as density will be:

Reference Volume Value($cm^3/px$)=(20/0.61)/120

Reference Volume Value($cm^3/px$)=0.27

Using this system, the reference volume value per pixel for the rest of food components will be:

Lettuce(density=0.36g/$cm^3$):0.14$cm^3/px$

Tomato(density=0.91g/$cm^3$):0.44$cm^3/px$

Bread(density=0.29g/$cm^3$):0.86$cm^3/px$

These values are the relation between the area of the food component, the density and the reference weight for the food component what will help the tool to sort food components by possible thickness.

The median thickness of food components usually present on restaurant menu items from the United States has been calculated, getting a median thickness of 1 cm. Once the tool has calculated the reference volume per pixel value for each food component, the tool calculated the median of the reference volume per pixel values and it attributes the thickness of 1 cm to the median value. Then, it proportionally calculates the thickness of the food components according to that relation between the median reference volume per pixel value and the median thickness (1 cm).

Example 2

The tool sorts food components by reference value per pixel, from higher to lower, corresponding that order also to the resulted higher-lower thickness values.

Bread (0.86 $cm^3$/px)
Tomato (0.44 $cm^3$/px)
Bacon (0.27 $cm^3$/px)
Lettuce (0.14 $cm^3$/px)

The median of all the reference volume per pixel values on the example above equals to 0.36 $cm^3$/px. Therefore, the tool attributes the thickness of 1 cm to 0.36 $cm^3$/px. On this image, food components with a reference volume per pixel value lower than 0.36 $cm^3$/px will have a thickness lower than 1 cm, while food components with higher values will have a thickness higher than 1 cm. The estimated thickness for the four food components according to 0.36 $cm^3$/px=1 cm would be:

Bread: 2.4 cm
Tomato: 1.2 cm
Bacon: 0.75 cm
Lettuce: 0.39 cm

This system to calculate thickness is believed to work sufficiently well, even for food components accumulated on top of each other on a specific area of the image. An example would be a pile of French fried potatoes or a serving of lettuce.

Inventors have determined that images containing more than five food components are best treated by normalizing the estimated thickness. The value for the normalization has been calculated according to the differences between the real thickness of food components and the estimated thickness for dishes of more than five food components.

Inventors have also found that the system to estimate thickness is not effective in the analysis of dishes containing only one food component as long as the estimated thickness would always be 1 cm. For that reason, after evaluations the system stores all the thickness results related to pixels for each food component in the thickness database. According to the stored information and through a linear regression between pixels and estimated thickness the system calculates the estimated thickness for the single food component. This estimation over time is improved as new image analyses are made in accordance with machine learning. This method is used only when single food components are identified on images.

The simplified method to generate thickness values for images with a single food component is described within an example on FIG. 9. Images from different restaurant menu items containing the food component of, for example, a tomato are analyzed at step 253, pixels are counted and thickness is estimated according to the process explained above at step 254. Counted pixels and estimated thicknesses for the food component from every image are stored in the thickness database classified by food component at step 255. In the event that an image contains a single food component, as for example tomato slices at step 256, the estimated thickness through the regular thickness estimation is 1 cm independently on the amount of pixels as can be seen on step 257. This happens because the median of the reference volume per pixel values will equal to the single food component reference volume per pixel value and therefore, the thickness will always be 1 cm. In order to avoid this, the system sends a request to the thickness database including the counted pixels as on step 258. At step 259, the system creates a linear regression with the stored pixels and thicknesses from step 254, being "x" thickness and "y" counted pixels. The thickness value for the single food component from the image is generated at step 261. The system updates the information to create linear regressions for each food component as soon as a new restaurant menu item image analysis containing more than one food component is carried out.

Once the tool knows the area in pixels and the estimated thickness of the food component, the system will be able to obtain the volume. The setback is that the area on the image can only be measured in pixels instead of cm, for that reason the system needs a conversion factor in order to convert pixels from the food component area to cm. Different real dimensions are usually taken into account by other systems for this purpose (plates, thumbs, spoons, forks, tablecloths, etc.). The inventive system doesn't need to use any real dimensions since customers or restaurants will not have time or the chance to provide system operator that information. However, the prior art technique of using different real dimensions may, optionally and alternatively, be employed in accordance with the present invention. The role of the conversion factor database is precisely that of storing estimated conversion factors, pixels and weights from previous image analysis for individual food components. The tool stores for each evaluated food component the relation between pixels/weight and conversion factor. Optionally, every time that a food component is evaluated, even in different restaurant menu item images, the information about the applied conversion factor is stored for that specific food component with the aim of using it for later evaluations.

However, the database having tediously may be implemented by starting with a few real conversion factors to begin the calculations. The first time that the inventive system uses the conversion factor database, a few restaurant menu item images with repeated food components are analyzed and known weights in order to identify the components, detect areas and collect the number of pixels related to each component. Ten restaurant menu items with known food component list and weights would be enough to run the database although it will be improved if we analyse more restaurant menu item images with known food component list and weights. The resulting conversion factors are used to estimate the conversion factors for the next analyzed restaurant menu item images.

The conversion factor for the next restaurant menu item images is calculated through a linear regression that uses the relationship between pixels/weight and conversion factor from past image analysis. This calculation is specific for each food component as long as the conversion factor will correspond to the amount of pixels and weight of the food component. Once the system obtains the conversion factors of all the food components present on the restaurant menu item image, the system calculates the median of the conversion factors of all the food components identified on the image and it converts the counted pixels for each food component to cm. Then, at multiplying the area in $cm^2$ by the thickness in cm, the tool obtains the volume of each food component in cubic centimeters.

Example 3

Consider that the first time the database is used, we provide to the system a few restaurant menu item images with known food component list and weights. The system, analyses the restaurant menu item images and counts the following amount of pixels:
  California Burger (235 g): burger patty 120 g (200 px), burger bun 60 g (400 px), bacon 20 g (120 px), lettuce 5 g (80 px), tomato 20 g (100 px), onion 10 g (70 px).
  Swiss Cheese Sandwich (277 g): bread 60 g (350 px), Swiss cheese 70 g (120 px), French fries 120 g (300 px), pickles 21 g (50 px), lettuce 6 g (40 px).
  Bacon Sandwich (272 g): bread 60 g (400 px), bacon 70 g (100 px), tomato 22 g (70 px), French fries 100 g (300 px), pickles 20 g (70 px).
  Bacon & Eggs (217 g): Bacon 60 g (300 px), eggs 90 g (320 px), pickles 22 g (150 px), tomato (200 px), lettuce 5 g (100 px)

In the next step, the food component weights counted pixels, density and estimated thickness are used to calculate a conversion factor value for each food component. The median of the calculated conversion factors for the food components in an image are stored in the conversion factor database classified by food component along with the counted pixels and weight of each food component.

Once the system has analyzed the first restaurant menu item images with known food component list and weight, the system can already analyze restaurant menu item images with unknown food component list and weight. Firstly, the tool counts the pixels of each food component present on the image.

Example 4

Consider, in particular, a BLT Sandwich: bacon (120 px), lettuce (200 px), tomato (50 px), bread (200 px).

After this, the system will send a request to the conversion factor database including information about counted pixels and standard menu item template weight to get a conversion factor for each food component of the analyzed image. With the information contained in the conversion factor database the system creates a linear regression, being "x" conversion factor and "y" pixels/weight. The linear regression is created for each food component containing more than three conversion factors. In the example above, the tool would create linear regressions for bacon, lettuce and tomato as long as they are repeated in three restaurant menu items images analyzed. After the conversion factor for each food component is generated, the median of the conversion factors of the food components present on the restaurant menu item image is calculated. The tool needs to obtain from the conversion factor database, the conversion factor of at least two food components. So, the system does not need to have previous conversion factors of all the food components present on the restaurant menu item image in order to calculate the median conversion factor that will be applied to all the food components.

In the example below (BLT Sandwich), after the analysis of several restaurant menu item images, the conversion factor database has stored the relation between pixels/weight and conversion factor for 3 out of 4 components present on the restaurant menu item image (bacon, lettuce and tomato). On the other hand, the conversion factor database only contains two conversion factors for the food component bread, therefore, the system will not be able to create a linear regression and generate a conversion factor for bread.

Example 5

The generated conversion factors after the creation of linear regressions for each food component is:
  Bacon: 20 g (120 px), 70 g (100 px), 60 g (300 px). Conversion factor: 0.42
  Lettuce: 5 g (80 px), 6 g (40 px), 5 g (100 px). Conversion factor: 0.015
  Tomato: 20 g (100 px), 22 g (70 px), 40 g (200 px). Conversion factor: 0.32
  Bread: 60 g (350 px), 60 g (400 px). Conversion Factor: no result.

In order to get the final conversion factor for all the food components of the BLT Sandwich, the median of the generated conversion factors is calculated. Being the result for the followed example 0.32. Therefore, 0.32 will be the conversion factor applied to all the food components from the BLT Sandwich to transform pixels to cm.

Example 6

The median conversion factor will be used to convert pixels to centimeters for all the food components present on the image.
  Bacon: 120 px*0.32
  Lettuce: 200 px*0.32
  Tomato: 50 px*0.32
  Bread: 200 px*0.32

This conversion factor along with pixels and resulted weight at later stages will be saved in the conversion factor database for each food component including bread. After this analysis, the system will have three conversion factors stored for bread and therefore, the next time that the system analyses a restaurant menu item image with the food component bread, the conversion factor database will be able to create the linear regression and generate a conversion factor for bread.

As seen on the example above, the system is able to calculate the median conversion factor of all the food components present on a restaurant menu item image only creating linear regressions of two or three food components. That allows the system to estimate the conversion factor of new analyzed food components through a cascade of information. When the conversion factor database runs for the first time, we may analyze only a few restaurant menu item images with known food component list and weight and the system may generate thousands of conversion factors for new food components. (Matching learning).

The cascade of information generated by the conversion factor database is described in FIG. 10. The first row of restaurant menu items as indicated at 262, represents restaurant menu items with known food component list and weight. Inside every restaurant menu item there is a restaurant menu item title as indicated at 263, the food component list for that restaurant menu item is shown as indicated at 264 and the number of conversion factors stored in the conversion factor database for that food component is shown in brackets as indicated at 265. Once the California burger, the Swiss cheese sandwich, the bacon sandwich and the bacon & eggs images are analyzed at steps 262, 266, 267 and 268, conversion factors are calculated for each food component of the restaurant menu items based on density, thickness, weight and counted pixels of each food component. Then, the median of the conversion factors of the components in a restaurant menu item is calculated and stored in the conversion factor database along with pixels and weight for each food component. After the image analysis of the four restaurant menu items at step 268, it can be seen that three conversion factors have been stored for bacon, one for eggs, three for pickles, three for tomato and three for lettuce. It means that the system will be able to generate conversion factors from the conversion factor database for restaurant menu items with unknown weight but containing at least two of the following food components: bacon, pickles, tomato and lettuce.

At step 269, restaurant menu item images with unknown food component list and weight are analyzed by the system and conversion factors are generated by the conversion factor database.

According to step 268, the conversion factor database has generated three linear regressions and three resulted conversion factors for pickles, tomato and lettuce at step 271, the median of these three conversion factors has been calculated and applied to all the food components present on the beef burger image. The median conversion factor applied is stored for each food component in the conversion factor database along with the counted pixels and resulting weight at later stages. At step 271, it can be seen that the number of conversion factors for lettuce increased from three to four. After each image analysis it can be seen how the amount of conversion factors increases for each food component. It allows the conversion factor database to generate conversion factors for food components which were never evaluated at step 262.

After the area in pixels is converted to centimeters for each food component through the median conversion factor, the resulting area is multiplied by the thickness, obtaining the estimated volume per food component.

For the calculation of the food component weights, the tool simply gets the real/estimated density and the estimated volume for each food component and applies the basic formula to calculate density, which is mass/volume.

Once the tool obtains the weight of the individual food components then the system stores that information in the conversion factor database and adds the weight of all the food components to obtain the total weight of the restaurant menu item which may be displayed to the user or be used to calculate nutrient and caloric information for the restaurant menu item.

The page with information shown after the consumer selects a restaurant menu item is illustrated in FIG. 11. The page shows the consumer a restaurant menu item with associated information, such as for example the restaurant menu item title at step 272. It also shows the list of food components of the restaurant menu item as indicated at 274 which also expands if the consumer clicks on one food component showing the list of ingredients of the clicked food component.

Reviews from other consumers who previously ordered the restaurant menu item are shown as indicated at 275. The restaurant menu item image is shown as indicated at 276, or if it has not been provided by any user or restaurant, the standard menu item image is shown.

The restaurant menu item description provided by the restaurant or by default included in the standard menu item template as indicated at 277 is shown below the restaurant menu item image. The food components with which the restaurant menu item is served are displayed as indicated at 278. The standard taste of the restaurant menu item is also provided as indicated at 279.

Calories and nutrients, calculated according to the restaurant menu item food component list and the calories and nutrients for each food component stored in the component database, are shown as indicated at 281. The food component list and weight may have been provided by the restaurant or by the system after the analysis of restaurant menu item images. For example, several images for a marinated grilled chicken sandwich meal provided by the restaurant or consumers may have been analyzed by the system, the average weight of the food components on those images calculated and the caloric and nutritional information calculated according to that average weight. Calories, nutrients and average weight of the restaurant menu item may be displayed as indicated at 281.

As indicated at 282, colored dots are shown for nutrients indicating if the resulted level of the nutrient in the restaurant menu item may be healthy or unhealthy according to daily nutrient reference intakes provided by the USDA. Red colored dots are used to indicate unhealthy levels and green colored dots are used to indicate healthy levels. Regular levels are not showing any dot. As indicated at 283, the consumer can select the quantity of the restaurant menu item. As indicated at 284, the consumer may select variations of the restaurant menu item or add additional restaurant menu items to the meal as drinks, desserts and side dishes.

The suggested variations on the restaurant menu item page are shown on FIG. 12. The restaurant may provide information to the system about restaurant menu item variations as for example the type of bread for the sandwich, a list of additional ingredients to put on the sandwich, the possibility to add tomato to the sandwich and the possibility to make the sandwich deluxe among others as indicated at 285, a variation title can be clicked by the consumer with the aim of making a customization of the restaurant menu item.

After one of the variation boxes is clicked as indicated at 287, a list of options related to the variation title is displayed. After each selection is made, an order summary and the calories and nutrient information from step 286 will be updated. Variations and additional restaurant menu items from the list may also be preselected for the consumer according to recommendation factors from the previous consumer browsing history, according to healthy recommendations, according to popularity of the variations and restaurant menu items, according to collaborative filtering or according to the restaurant suggestions. As an example, the consumer may select the addition of a dessert in order to select it from the restaurant desserts list if a dessert has not been suggested by the system according to any recommendation system as indicated at 287.

The list of options inside a selected variation is shown on FIG. 13. Once the consumer has selected a restaurant menu item variation or a restaurant addition in order to customize the restaurant menu item, a list of options inside the selected variation or addition will be displayed along with images as indicated at 288. As an example, the consumer selected the addition of a restaurant dessert and as indicated at 288 a list of restaurant desserts along with the corresponding images provided by the restaurant or contained in the standard menu item database is displayed to the consumer. The consumer may click on the name of any of the restaurant desserts as indicated at 289 in order to see a description of the restaurant dessert as indicated at 291. The consumer will also be able to find an enlarged image of the variation or additional option as indicated at 292.

Other information, such as the ingredients or the taste of the variation or addition may also be displayed as indicated at 293. As indicated at 294, the weight of the variation or addition is provided. The weight of the additional restaurant menu item or restaurant menu item variation may have been provided by the restaurant or calculated through the system after analysis of restaurant menu item images. As indicated at 295, calories and nutrients according to step 294 are displayed. As indicated at 296, clicking on the price, the consumer may add the additional restaurant menu item or variation to the order summary.

The display of nutrient and caloric information according to selected variations and additions by the consumer is described on FIG. 14. Once the consumer has selected a variation or addition for the restaurant menu item, as for example a cheese cake, the name of the selected variation or addition is displayed on the order summary as indicated at 297 and the name of the selected variation option is also displayed as indicated at 298, with the total price being calculated as indicated at 299. The calories and nutrients of the order according to the customization made by the consumer, may consist of the addition of a restaurant menu item or the selection of a variation of the restaurant menu item, and will be displayed as indicated at 301. As an example, the nutrients and calories displayed as indicated at 301 correspond to the marinated grill chicken sandwich with white bread and with an addition of a cheese cake dessert. Colored dots or any other systems indicating the healthy or unhealthy character of the calculated nutrient and caloric levels may be displayed beside the nutrient and caloric values.

In summary, the consumer will be able to check the customizations made to the restaurant menu items as indicated at 297, 298 and 299 and will also be able to check the nutrient and caloric information for that customization as indicated at 301 before deciding to add the restaurant menu items to the bag as indicated at 302. There would be a possibility for the consumer to change his mind as indicated at 301 and make an healthier selection of variations and additions before going to step 302.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method of implementing transactions between food providers and consumers while providing nutrition information to the consumer, comprising:
   (a) creating in a computer memory a menu item database of menu items offered by food providers, said menu items comprising a plurality of components, said menu item database comprising menu item associated information and associated food provider identification information for a plurality of menu items, comprising:
      (i) obtaining menu item identification information associated with a menu item, and storing said menu item identification information in said menu item database;
      (ii) obtaining food provider identification information for the food provider offering said menu item and storing said food provider identification information associated with said menu item identification information in said menu item database, said menu item identification information being stored as associated with said food provider identification information;
      (iii) obtaining component inclusion information for the menu item and storing said component inclusion information associated with said menu item in said menu item database, said component inclusion information being stored as associated with said menu item identification information;
      (iv) obtaining component nutrition information for said component and storing said component nutrition information associated with said menu item identification information and said component of said menu item in said menu item database; and
      (v) repeating steps 1(a)(i) through 1(a)(iv) for a plurality of menu items offered by a plurality of food providers;
   (b) presenting a plurality of menu items from a food provider to a consumer over a communication network;
   (c) receiving a consumer selection and/or deselection of a menu item or items from the consumer over said communication network;
   (d) presenting the sum of all nutrition information for all of the components of said selected menu item or menu items to said consumer over said communication network;
   (e) completing a sale of the selected menu item or menu items to the consumer;
   (f) receiving a menu item image, said menu item image being digital and comprising a plurality of pixels, for which nutrition information is known, and storing said menu item image associated with said menu item identification information in said menu item database;
   (g) identifying portions of said image associated with a component;
   (h) measuring the image size for said component;
   (i) calculating a component specific conversion factor for transforming image size to nutrition information based upon said image size and said stored component nutrition information;
   (j) receiving a menu item image of a menu item, for which nutrition information is not known, having a component for which there is stored component nutrition information;
   (k) measuring the image size of the component of the menu item for which nutrition is not known using a segmented area characteristic; and
   (l) using said conversion factor to calculate generated nutrition information for the component of said menu item for which nutrition information is not known.

2. The method of claim 1, wherein the component nutrition information is obtained from a published source.

3. The method of claim 1, wherein the component nutrition information is derived from information in a recipe for the component.

4. The method of claim 1, wherein the component nutrition information is obtained by preparing an example of the component in a kitchen, photographing the component to create a segmented area image and inputting the segmented area image into a component nutrition information database associated with said component prepared in a kitchen.

5. The method of claim 1, wherein a program resident in the computer memory is configured to receive images of menu items which are collected from consumers over said communication network, said images being broken down into individual component(s) image area(s), said component image area(s) being operated on by said conversion factor to derive verifying component nutrition information, and wherein said verifying component nutrition information is introduced into said menu item database to improve the accuracy of component nutrition information for said component(s) of said menu item in said menu item database.

6. The method of claim 5, wherein the known, component, generated and/or sum of all nutrition information is presented substantially in real time as said menu items are selected and/or deselected over said communication network.

7. The method of claim 1, wherein the known, component, generated and/or sum of all nutrition information is presented substantially in real time as said menu items are selected and/or deselected.

8. The method of claim 7, wherein menu item price information is presented, together with the sum of all price information for all selected menu items.

9. The method of claim 1, wherein the known, component, generated and/or sum of all nutrition information for sold menu items is placed in a database associated with a particular consumer to create a database of food consumption information to assist in consumer objectives such as weight loss and health.

10. The method of claim 9, wherein one or more persons are associated with a particular order, and wherein nutrition information is associated with each person.

11. The method of claim 9, wherein one or more persons are associated with a particular order and wherein nutrition information is associated with each person and wherein nutrition information for each person is supplemented by dietary intake information entered by the individual for food consumed but not purchased from the operator of the method.

12. The method of claim 9, wherein before or after menu item selection, menu items are suggested to the consumer for selection by presentation on the display of the computing device of the consumer.

13. The method of claim 12, wherein prior menu item selections of the consumer are maintained in a database and said suggestion of menu items to the consumer is determined, at least in part, by said prior menu item selections of said consumer.

14. The method of claim 12, further comprising, producing time of day information, and wherein a program resident in a computer memory is configured to receive said time of day information and in response to the time of the selection and/or deselection of menu items by the consumer determine a menu item suggestion as a function, at least in part, of the time of day.

15. The method of claim 1, wherein thickness is estimated for a particular component and the estimated thickness is stored, and wherein said estimated thickness is used to generate the thickness of a component in a newly acquired image.

16. The method of claim 1, wherein, after receiving a menu item image of a menu item for which nutrition information is not known, said menu item image of a menu item for which nutrition information is not known is analyzed into components by operating on said menu item image of a menu item for which nutrition information is not known in blocks of pixels and comparing the color of pixel blocks to known components to identify components and their nutritional value.

17. The method of claim 16, wherein the pixel blocks have a color component and are converted into color histograms for comparison to reference colors associated with respective components to identify a component.

18. The method of claim 17, wherein the pixel blocks are resized to lower the number of pixels and/or the number of colors before the conversion to the color histograms.

19. The method of claim 1, wherein, after receiving a menu item image of a menu item for which nutrition information is not known, said menu item image of a menu item for which nutrition information is not known is analyzed into components by operating on said menu item image of a menu item for which nutrition information is not known by comparing the color of pixels to the color of known components to identify components and using the number of pixels to estimate volume, using known density of the component to estimate weight and nutritional value.

20. A method of providing nutrition information to a consumer, executed on a computer or central processing unit comprising a processor and a computer memory, said computer or central processing unit being connected to computers of consumers and computers of food providers over a communication network, comprising:
  (a) creating a menu item database of menu items, said menu items comprising one or more components, said menu item database comprising menu item associated information, comprising:
    (i) obtaining menu item identification information associated with a menu item, and storing said menu item identification information in said menu item database;
    (ii) obtaining component inclusion information for the menu item and storing said component inclusion information associated with said menu item in said menu item database, said component inclusion information being stored as associated with said menu item identification information; and
    (iv) obtaining component nutrition information for said one or more components of said menu item and storing said component nutrition information associated with said menu item identification information and said component of said menu item in said menu item database;
  (b) presenting a plurality of menu items to a consumer computer;
  (c) receiving a consumer selection and/or deselection of a menu item from the computer of a consumer;
  (d) presenting the sum of all nutrition information for all of the components of said selected menu item or menu items to said consumer on said computer of said consumer;
  (e) completing a sale of the selected menu item or menu items to the consumer;

(f) receiving a menu item image, for which nutrition information is known, and storing said menu item image associated with said menu item identification information in said menu item database;

(g) identifying portions of said image associated with different components on the basis of color and dividing said image into a plurality of components;

(h) measuring the image size for each of said components;

(i) calculating a conversion factor for transforming image size to nutrition information based upon said image size and said stored component nutrition information;

(j) receiving a menu item image of a menu item for which nutrition information is not known;

(k) measuring the image size of the component(s) of the menu item for which nutrition is not known; and (l) using said conversion factor to calculate nutrition information for each of the component or components of said menu item for which nutrition information is not known.

21. A method for calculating nutrition information of food components, to be executed on a computer or central processing unit comprising a processor and a computer memory, said computer or central processing unit being connected to computers of consumers and computers of food providers over a communication network, comprising:

(a) receiving a menu item image, for which nutrition information is known, and storing said menu item image associated with its respective menu item identification information in a menu item database;

(b) identifying portions of said image associated with different components and dividing said image into a plurality of components;

(c) measuring the image size for each of said components;

(d) calculating a conversion factor for transforming image size to nutrition information based upon said image size and said stored component nutrition information;

(e) receiving a menu item image of a menu item for which nutrition information is not known, said menu item image of a menu item for which nutrition information is not known comprising pixels with a color component;

(f) measuring the image size of the component(s) of the menu item for which nutrition is not known; and (g) using said conversion factor to calculate nutrition information for each of the component or components of said menu item for which nutrition information is not known, wherein, after receiving a menu item image of a menu item for which nutrition information is not known, said menu item image of a menu item for which nutrition information is not known is analyzed into components by operating on pixels of said menu item image of a menu item for which nutrition information is not known by comparing the color of said pixels to the color of known components to identify a component.

22. The method of claim 9, wherein the restaurant menu items are delivered by the restaurant to the consumer, and wherein after the restaurant menu items have been delivered by the restaurant, the consumer captures an image of the restaurant menu item on a smart phone or other device and sends it to the computer or central processing unit and said image is then analyzed to determine an updated nutritional content of the menu item using the methodology of steps (e), (f) and (g).

* * * * *